(12) United States Patent
Narin et al.

(10) Patent No.: US 7,523,310 B2
(45) Date of Patent: Apr. 21, 2009

(54) DOMAIN-BASED TRUST MODELS FOR RIGHTS MANAGEMENT OF CONTENT

(75) Inventors: Attilla Narin, Bothell, WA (US); Peter David Waxman, Bellevue, WA (US); Thomas K. Lindeman, Redmond, WA (US); Frank Byrum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 10/185,077

(22) Filed: Jun. 28, 2002

(65) Prior Publication Data

US 2004/0003251 A1 Jan. 1, 2004

(51) Int. Cl.
*H04L 9/00* (2006.01)
(52) U.S. Cl. .................................... 713/172
(58) Field of Classification Search ............... 705/57; 709/217; 380/269, 30; 713/2, 172
See application file for complete search history.

(56) References Cited

U.S. PATENT DOCUMENTS

| | | | | |
|---|---|---|---|---|
| 5,774,552 | A * | 6/1998 | Grimmer | 713/156 |
| 6,005,943 | A * | 12/1999 | Cohen et al. | 380/30 |
| 6,327,652 | B1 * | 12/2001 | England et al. | 713/2 |
| 6,398,245 | B1 | 6/2002 | Gruse et al. | 280/228 |
| 7,089,208 | B1 * | 8/2006 | Levchin et al. | 705/39 |
| 2001/0051996 | A1 * | 12/2001 | Cooper et al. | 709/217 |
| 2002/0002543 | A1 * | 1/2002 | Spooren et al. | 705/57 |
| 2002/0006204 | A1 * | 1/2002 | England et al. | 380/269 |

(Continued)

FOREIGN PATENT DOCUMENTS

WO    WO 01/98903 A1    12/2001

(Continued)

OTHER PUBLICATIONS

"Public key certificate." Wikipedia, The Free Encyclopedia. Nov. 30, 2005, 00:20 UTC. Nov. 28, 2005, 19:19 <http://en.wikipedia.org/w/index.php?title=Public_key_certificate&oldid=29642766>.*

(Continued)

*Primary Examiner*—Kambiz Zand
*Assistant Examiner*—Jason K Gee
(74) *Attorney, Agent, or Firm*—Woodcock Washburn LLP

(57) ABSTRACT

In a system for distributing and licensing rights-managed digital content, the way in which content is distributed and licensed can be affected by the trust relationships that are established between the various servers that participate in the system. In a typical system, a license server licenses content to particular identities, and an identity server defines those identities by issuing certificates for those identities. The license server issues licenses to identities that have been issued by trusted identity servers. Also, the license server can issue a license on behalf of any entity whose private key it holds. Thus, in one embodiment, the universe of people to whom the license server can issue licenses can be expanded by adding new identity servers to the list of trusted identity servers. In another embodiment, exceptions to the general trust of an identity server can be carved out by creating an exclusion list, which excludes particular identity certificate (e.g., on the basis of e-mail address, domain name, etc.) that have been issued by a trusted identity server. In another embodiment, the universe of content for which the license server can issue licenses can be expanded by providing the license server with the private keys of other license servers.

7 Claims, 15 Drawing Sheets

U.S. PATENT DOCUMENTS

2003/0163730 A1* 8/2003 Roskind et al. ............. 713/201

FOREIGN PATENT DOCUMENTS

WO     WO 02/01333 A3     1/2002

OTHER PUBLICATIONS

Khare, R. et al., "Trust Management on The World Wide Web", www.firstmonday.dk/issues/issues3, 1998, pp. 1-17.

Mont, M.C. et al., "A Distributed Service, Adaptive to Trust Assessment, Based on Peer-to-Peer E-Records Replication and Storage", *Future Trends of Distributed Computing Systems*, 2001, 89-95.

Poore, R.S. "Anonymity, Privacy, and Trust", 1999, 8(3), 16-20.

ePSO Inventory DataBase, "Electronic Payment System Observatory Inventory Database", http://www.jrc.es/cfapp/invent/details.cfm?uID=276, 2001, XP-002259889, 2 pages.

* cited by examiner

| SRL 308 | CONTENT INFO | DRM SERVER INFO | -(PU-DRM(DES1)) | - REFERRAL INFO | --URL | --FALL-BACK | RIGHTS LABEL INFO | (DES1(RIGHTSDATA)) | (DES1(CK)) | S (PR-DRM) |

FIG. 3

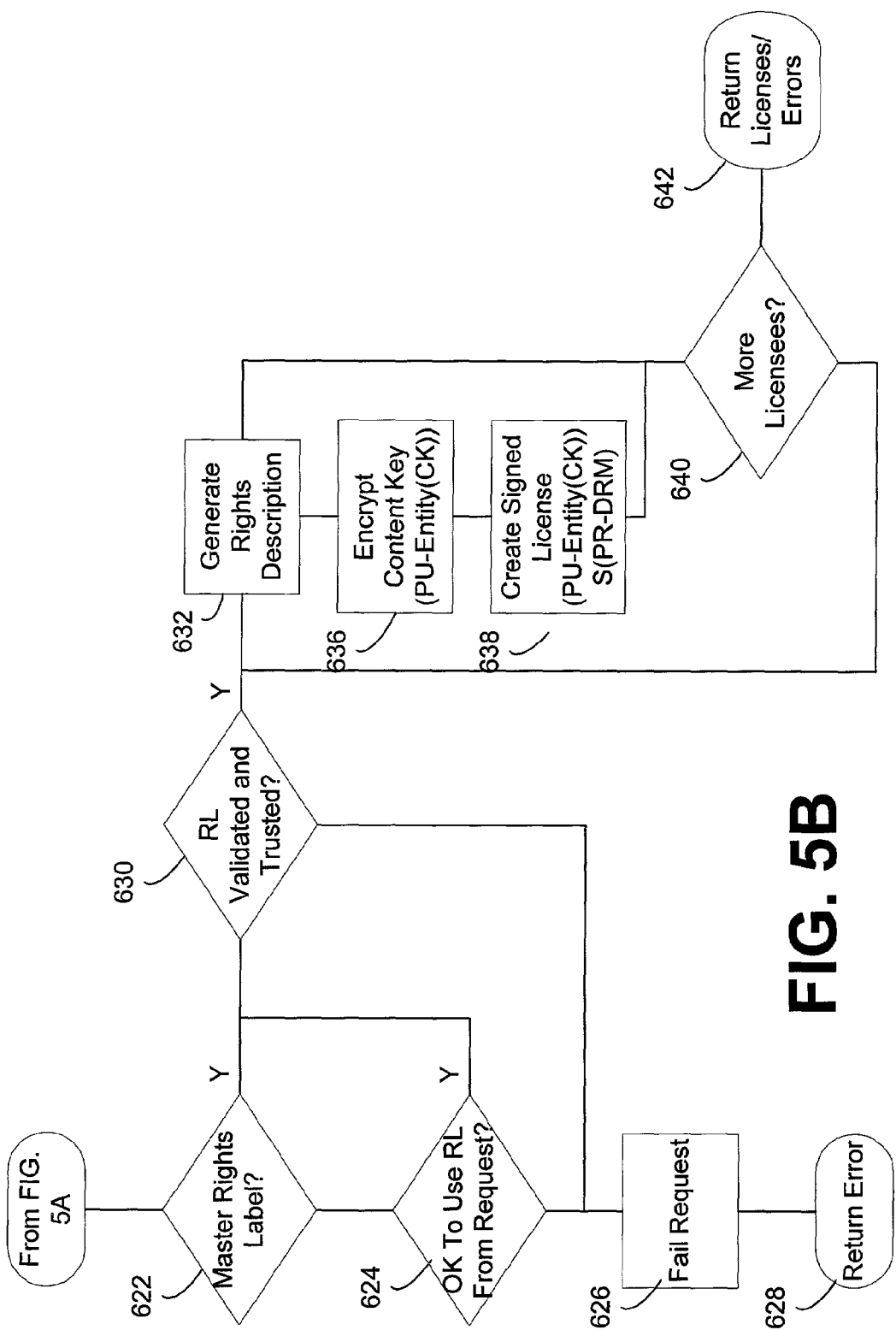

DOMAIN-BASED TRUST MODELS FOR RIGHTS MANAGEMENT OF CONTENT

TECHNICAL FIELD

The invention relates to digital lights management systems. In particular, the invention relates to the use of trust models to define who can receive a license for a piece of rights managed content, and who can issue such a license.

BACKGROUND OF THE INVENTION

Digital rights management ("DRM") and enforcement is highly desirable in connection with digital content such as digital audio, digital video, digital text, digital data, digital multimedia, software, etc., where such digital content is to be distributed to one or more users. Digital content could be static, such as a text document, for example, or it could be streamed, such as the streamed audio/video of a live event. In a typical use of a rights-management system, a user receives a piece of digital content via a network (e.g., the Internet), or on a physical medium (e.g., on a disk). Additionally, if the user is permitted to "consume" the content (e.g., play audio or video content, view textual content, execute the software, etc.), the user also receives a license for such content. The rights-management system enforces the requirement that the user can consume the content only when such consumption is permitted by the terms of the license.

Rights management systems typically rely on cryptography in at least two contexts. First, content that needs to be protected is encrypted. Second, given that any meaningful use of encrypted content requires the decryption key, the keys must be distributed only to trusted entities, and cryptographic certificates and signatures are used to establish this trust. In the simplest rights management system, the owner of encrypted content directly verifies the trustworthiness of the consumer of that content, and, if the owner is satisfied of the consumer's trustworthiness, distributes a license containing the decryption key to that consumer. Such a system, however, does not provide rich enough capabilities to be of much commercial significance. Most content—like anything else in commerce—is distributed through a complex chain or web of relationships. For example, the content owner may actually delegate to a distributor the task of issuing licenses (and, thus, keys) for content. In this case, the decoupling of the content owner from the license distributor provides greater flexibility in terms of how content gets distributed (e.g., the content owner does not need to spend time or money distributing content and operating a licensing server). On the other hand, this decoupling also requires that the content owner (who has a proprietary interest in the content) trust the license distributor (who has the power to affect the owner's proprietary interest).

Other aspects of the distribution/rights-management process can be decoupled as well. For example, when the licensor issues a license that allows a user to consume a piece of content on a particular hardware platform, the licensor is implicitly making a decision about: (a) the identity of the user (if licensure limited to particular users), and (b) the security of the platform on which the content will be consumed. The licensor may make this decision directly, but it may be useful to allow another entity (an "identity issuer" or "identity server") to issue a certificate attesting such identity and platform security, and for the licensor to simply rely on this certificate. This decoupling, however, implicitly requires that the licensor trust the issuer of the identity certificate, since continued control of the content is dependent on such a certificate not being issued to an imposter, or for an insecure platform. Another aspect of the distribution and rights-management process that may be decoupled is that the entity that defines the circumstances under which a license may be issued may be different from the entity that actually issues the license. Thus, when content is published, a first entity may digitally sign a rights label that specifies the licensing conditions, and a second entity may actually issue the license that permits the content to be used. Again, this type of decoupling requires that the first entity trust the second entity only to issue licenses under the specified conditions.

It can be appreciated from the foregoing discussion that the practical reality of who can license a document and under what circumstances can be affected by who trust whom. The universe of who can obtain a license for content can be expanded (or contracted) by extending (or withholding) trust between various servers that participate in the distribution and licensing process.

The present invention provides a technique for using trust to control access to content, which has not been realized in the prior art.

SUMMARY OF THE INVENTION

The invention provides systems and methods that use a trust model to affect how, and under what circumstances, rights-managed content is licensed.

A digital rights management (DRM) system in accordance with the invention publishes content in such a way that it can only be used by an entity to whom the content is licensed. Content that is to be DRM-protected is encrypted and then published with a "signed rights label." The signed rights label contains, among other things: (a) rights data, which defines how the content may be used and to whom it may be licensed; (b) the decryption key for the content, encrypted (either directly or indirectly) by the public key of the server that issued the rights label; and (c) the digital signature of the server that issued the rights label. Each entity (e.g., a person, a corporate department, a non-profit organization, etc.) that can potential receive rights-managed content obtains an "entity certificate" that defines that entity's identity. The entity certificate contains: (a) a public/private key pair, and (b) the signature of the server that issued the entity certificate.

A request to license content includes the signed rights label for the content, and the entity certificate of the entity to whom the license will issue. When a DRM license server receives such a request, it determines that the entity certificate was signed by a server that the licensor trusts. (The licensor may want to ensure, for example, that the server will be sufficiently rigorous in verifying the entity's identity before issuing such a certificate.) If the license server trusts the signer of the entity certificate, then the license server determines whether it can issue a license on behalf of the entity that signed the rights label. In general, a license server can issue licenses based on: (a) rights labels that the server, itself, has issued, and (b) other DRM servers that have shared their private key with the license server. (A license server needs the private key of the server that issued the rights label, because the rights label include the content decryption key encrypted by the issuing server's public key; since a license contains the content decryption key encrypted by the public key of the entity certificate, the license server needs the applicable private key in order to decrypt the content key so the content key can be reencrypted with the entity certificate's public key.)

The operator of a DRM server can enlarge (or shrink) the universe of people to whom content may be licensed—and otherwise affect the topology of the distribution scheme—by determining which other servers will be trusted, and which ones will not be trusted. These decisions can be used in connection with various exemplary trust models.

In a first example, trust decisions can be employed to implement a "trusted persona domain," where a DRM server maintains a list of servers who are trusted to issue entity certificates. This scheme may be useful if two organizations want their members to be able to share rights managed information. Thus, if company A and company B each issue entity certificates for their own employees, these companies may agree to trust each other's identity servers. Thus, an employee of company A can publish content that is licensable to an employee of company B, and vice versa. The company B employee who receives content that has been published by a company A employee presents the rights label and his own entity certificate to company A's DRM license server; that license server will be able to license the content to the company B employee's entity certificate, because the two companies have agreed to trust each other's identity servers. One variation on this example is where a DRM license server generally trusts a public e-mail address-based identity server (such as a MICROSOFT.NET PASSPORT server), except for certificates that such server has issued to a particular persona (e.g., joe@untraceableaddress.com) or domain (e.g., all addresses from untraceableaddress.com). Even more generally, for any identity server in the trusted persona domain, a list of exclusions based on e-mail address, domain, or some other identifier may be created, so that a license server can generally trust an identity server while carving out particular exceptions to that trust.

In a second example, trust decisions can be employed to implement a "trusted document domain." In this case, a first DRM server can issue licenses based on rights labels that have been created by a second DRM server by obtaining the second DRM server's private key. In effect, such a transaction means that the second DRM server trusts the first DRM server to issue licenses on the second server's behalf. This scheme may be useful if two departments within a company each maintain a DRM server (e.g., if the two departments are separated geographically). In this case, each department may want to publish content that the other department can license on its own DRM server—e.g., a department A employee publishes content using the department A DRM server and sends the published content, along with the signed rights label to a department B employee; the department B employee then submits the signed rights label to the department B DRM server for a license. This scenario can be enabled by providing the department A private key to the department B DRM server.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a block diagram showing the structure of a signed rights label as produced by the method of FIG. 3.

FIGS. 5A and 5B provide a flowchart of a preferred embodiment of a method according to the invention for licensing rights managed digital content.

DETAILED DESCRIPTION OF THE INVENTION

Exemplary Computing Environment

Figure 1:
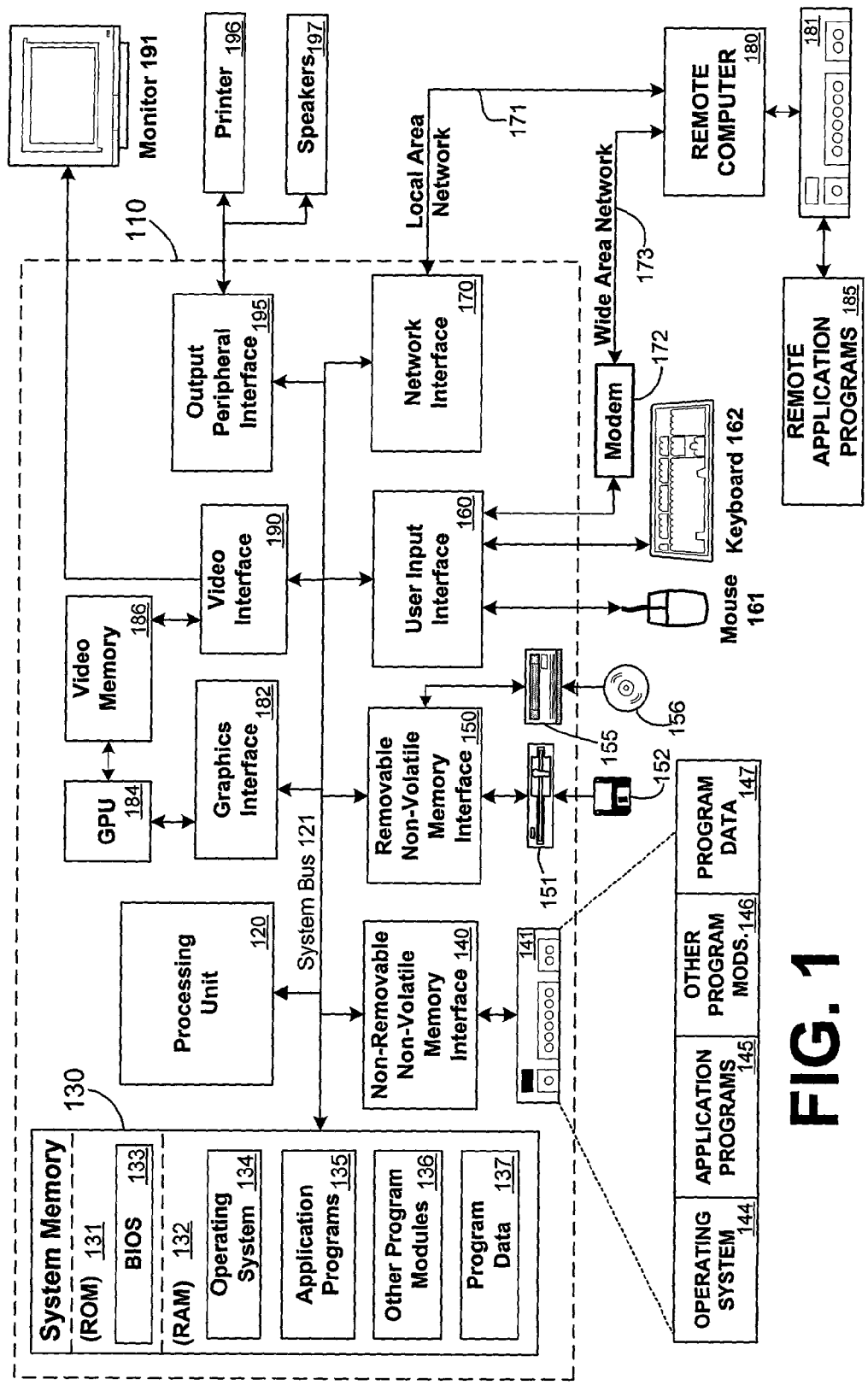
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multiprocessor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Publishing Digital Content

Figure 2:
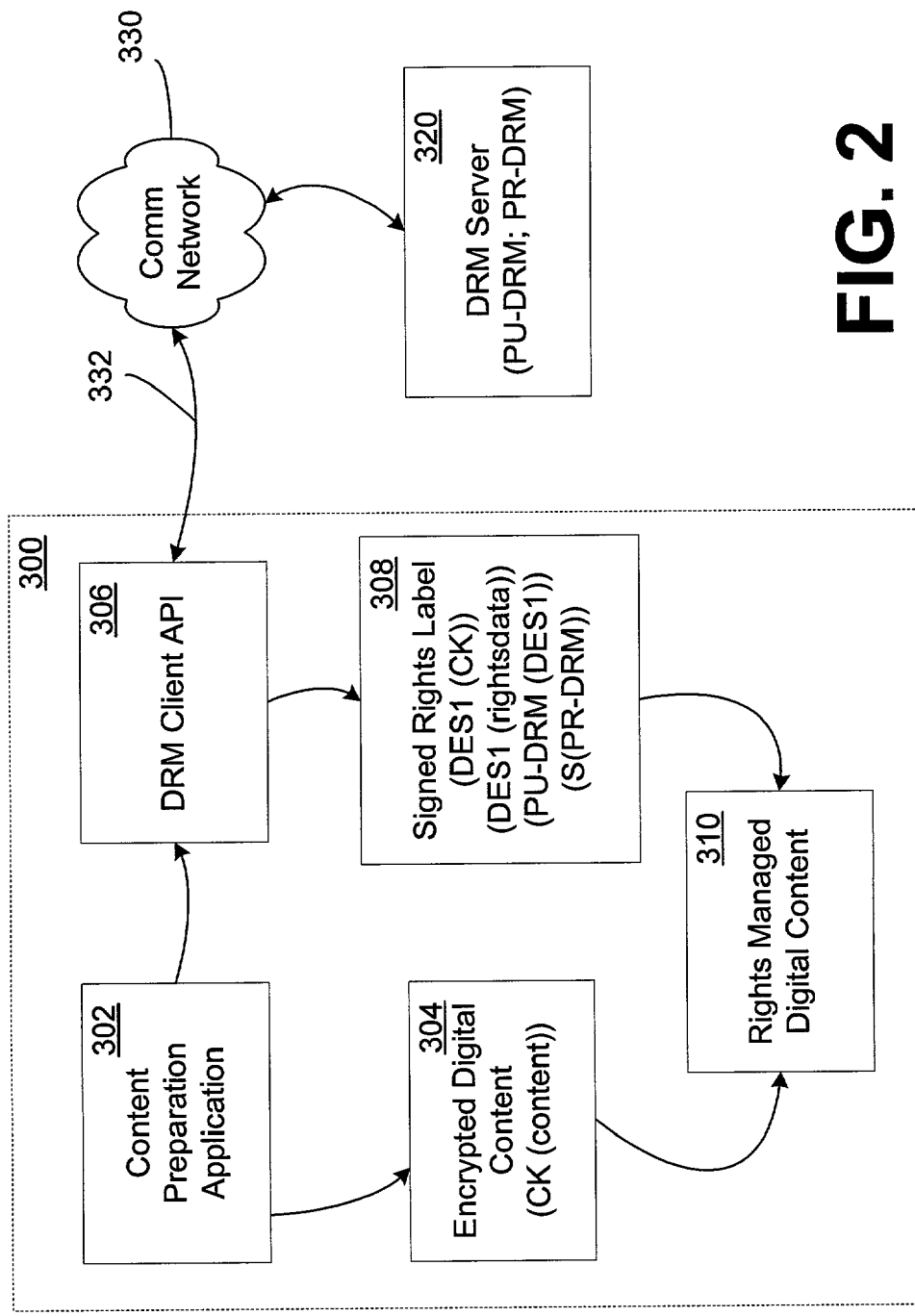
FIG. 2 is a functional block diagram of a preferred embodiment of a system and method according to the invention for publishing digital content.

FIG. 2 is a functional block diagram of a preferred embodiment of a system and method according to the invention for publishing digital content. "Publishing," as that term is used herein, refers to a process that an application or service follows to establish with a trusted entity a set of rights and conditions that the entity can issue for that content, as well as to whom those rights and conditions can be issued. According to the invention, the publishing process includes encrypting the digital content and associating a list of persistent enforceable rights that the author of the content intended for all possible users of the content. This process can be carried out in a secure way to prohibit access to any of the rights or to the content unless intended by the author of the content.

In a preferred embodiment of the invention, three entities in particular can be employed to publish secure digital content: a content preparation application 302 that executes on the client 300 and prepares the content for publishing, a digital rights management (DRM) applications program interface (API) 306 that also resides on the client device 300, and a DRM server 320 that is communicatively coupled to the client 300 via a communication network 330. In a preferred embodiment of the invention, the communication network 330 includes the Internet, though it should be understood that the communication network 330 could be any local or wide area network, such as a proprietary intranet, for example.

The content preparation application 302 can be any application that produces digital content. For example, the application 302 can be a word processor or other publisher that produces digital text files, digital music, video, or other such content. The content could also include streamed content, such as streamed audio/video of a live or taped event, for example. According to the invention, the content preparation application invites the user thereof to encrypt the content using a key (CK) that the user provides. The application 302 uses the key to encrypt the digital content, thus forming an encrypted digital content file 304. The client application also invites the user to provide rights for the digital content file 304. The rights data includes a respective identity for each entity that has rights in the digital content. Such an entity can be, for example, an individual, a class of individuals, or a device. For each such entity, the rights data also includes a list of rights that the entity has in the content, and any conditions that may be imposed on any or all of those rights. Such rights can include the right to read, edit, copy, print, etc, the digital content. Additionally, rights can be inclusive or exclusive. Inclusive rights indicate that a specified user has a specified right in the content (e.g., the user can edit the digital content). Exclusive rights indicate that a specified user has all rights in the content except those specified (e.g., the user can do anything with the digital content except copy it).

According to one embodiment of the invention, the client API 306 can pass the encrypted digital content and the rights data to the DRM server 320. Using a process that is described in detail below, the DRM server 320 determines whether it can enforce the rights that the user has assigned and, if so, the DRM server 320 signs the rights data to form a signed rights label (SRL) 308. In general, however, any trusted entity can sign the rights data, preferably using a key trusted by the DRM server 320. For example, a client can sign the rights data using a key provided to it by the DRM server 320.

The rights label 308 can include data representing the rights description, the encrypted content key, and the digital signature over the rights description and the encrypted content key. If the DRM server is signing the rights label, it passes the signed rights label 308 back to the client through the client API 306, which stores the signed rights label 308 on the client device 300. The content preparation application 302 then associates the signed rights label 308 with the encrypted digital content file 304. For example, the SRL 308 can be concatenated with the encrypted digital content file to form a rights managed content file 310. In general, however, the rights data need not be combined with the digital content. For example, the rights data could be stored in a known location, and a reference to the stored rights data could be combined with the encrypted digital content. The reference could include an identifier that indicates where the rights data is stored (e.g., the data store that contains the rights data), and an identifier that corresponds to that particular rights data at that particular storage location (e.g., that identifies the file that contains the particular rights data of interest). The rights managed content 310 can then be delivered to anyone anywhere, and only those entities that have rights to consume the content can consume the content, and only in accordance with the rights they were assigned.

The SRL 308 is a digitally signed document, which makes it tamper-resistant. Additionally, the SRL 308 is independent of the actual key type and algorithm used to encrypt the content but maintains the strong 1-1 relation to the content it is protecting. Referring now to FIG. 3, in one embodiment of the present invention, the SRL 308 may include information on the content that is the basis of the SRL 308, including perhaps an ID of the content; information on the DRM server that signs the SRL 308, including (PU-DRM(DES1)) and referral information such as a URL for locating the DRM server on a network and fall-back information if the URL fails; information describing the SRL 308 itself; (DES1 (rightsdata)): (DES1(CK)); and S (PR-DRM), among other things.

By ensuring that a trusted entity signs the rights data to create a signed rights label 308, the DRM server is asserting that it will issue licenses for the content in accordance with the terms set forth by the publisher as described in the rights data of the rights label 308. As should be appreciated, a user is required to obtain a license to render the content, especially inasmuch as the license contains the content key (CK). When a user wants to obtain a license for the encrypted content, the user can present a license request including the SRL 308 for the content and a certificate verifying the user's credentials to the DRM server 320 or other license issuing entity. The license issuing entity can then decrypt (PU-DRM(DES1)) and (DES1(rightsdata)) to produce the rights data, lists all the rights granted by the author (if any) to the license requesting entity, and construct a license with only those specific rights.

Preferably, upon the application 302 receiving the SRL 308, such application 302 concatenates the signed rights label 308 with the corresponding (CK(content)) 304 to form rights managed digital content. Alternatively, the rights data can be stored in a known location, with a reference to that location provided with the encrypted digital content. Thus, a rendering application that is DRM-enabled can discover the signed rights label 308 via the piece of content the rendering application is attempting to render. This discovery triggers the rendering application to initiate a license request against the DRM licensing server 320. Publishing application 302 can store a URL to the DRM licensing server 320, for example, or the DRM licensing server 320 can embed its own URL as a piece of metadata into the rights label before digitally signing it, so that the DRM client API 306 called by the rendering application can identify the correct DRM licensing server 320. Preferably, a unique identifier, such as a globally unique identifier (GUID), for example, is put into the rights label before it is signed.

In a preferred embodiment of the invention, the simple object access protocol (SOAP) can be used for communication between the content protection application 302 or the rendering application and the DRM server 320. Additionally, API libraries, such as API 306, can be provided so that applications, such as application 302, are not required to implement the client side of the DRM protocol, but rather can just make local API calls. Preferably, XrML, an XML language, is used for describing rights descriptions, licenses, and rights labels for digital content, though it should be understood that any suitable format can be uses for the rights description and other data.

Obtaining a License for the Published Content

Figure 4:
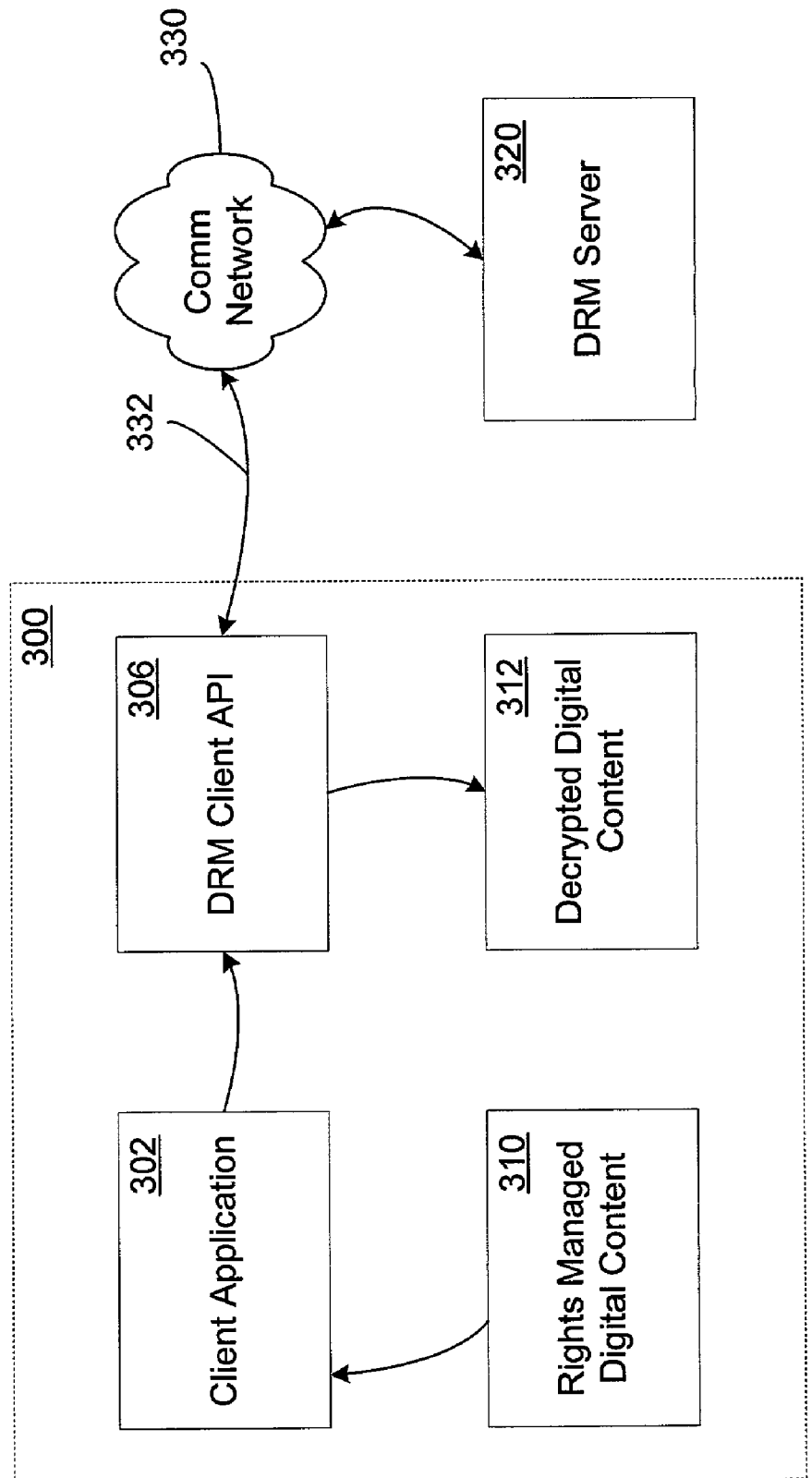
FIG. 4 is a functional block diagram of a preferred embodiment of a system and method according to the invention for licensing rights managed digital content.

FIG. 4 is a functional block diagram of a preferred embodiment of a system and method according to the invention for licensing rights managed digital content. "Licensing," as that term is used herein, refers to a process that an application or service follows to request and receive a license that will enable an entity named in the license to consume the content in accordance with the terms specified in the license. Inputs to the licensing process can include the signed rights label (SRL) 308 associated with the content for which a license is being requested, and the public key certificate(s) of the entity (s) for which the license is being requested. Note that the entity requesting a license need not necessarily be the entity for which the license is being requested. Typically, a license includes the rights description from the SRL 308 an encrypted key that can decrypt the encrypted content, and a digital signature from the license server over the rights description and the encrypted key. The digital signature asserts that the entities and rights named are legitimate.

One way for the application 302 to consume the rights managed content 310 is for the client API 306 to forward the signed rights label 308 of the rights managed content 310 to the DRM server 320 via the communication network 330. The location of the DRM server 320 can be found, for example, in the referral information in the SRL 308. In such an embodiment, the DRM licensing server 320, via a process that is described in detail below, can use the rights description in the rights label to determine whether it can issue a license and, if so, to derive the rights description to include with the license. As described above, the rights label 308 contains the content key (CK) encrypted according to the public key of the DRM server 320 (PU-DRM) (i.e., (PU-DRM(CK))). In the process of issuing a license, the DRM server 320 securely decrypts this value to obtain (CK). It then uses the public key (PU-ENTITY) in the public key certificate that is passed up in the license request to re-encrypt (CK) (i.e., (PU-ENTITY(CK))). The newly encrypted (PU-ENTITY(CK)) is what the server 320 places into the license. Thus, the license can be returned to the caller without risk of exposing (CK), since only the holder of the associated private key (PR-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

Alternatively, a client, such as the publishing client, for example, can issue its own license to consume the content. In such an embodiment, a secured process can be run on the client computer that provides the client with the key(s) necessary to decrypt the digital content under appropriate circumstances.

Figure 5A:
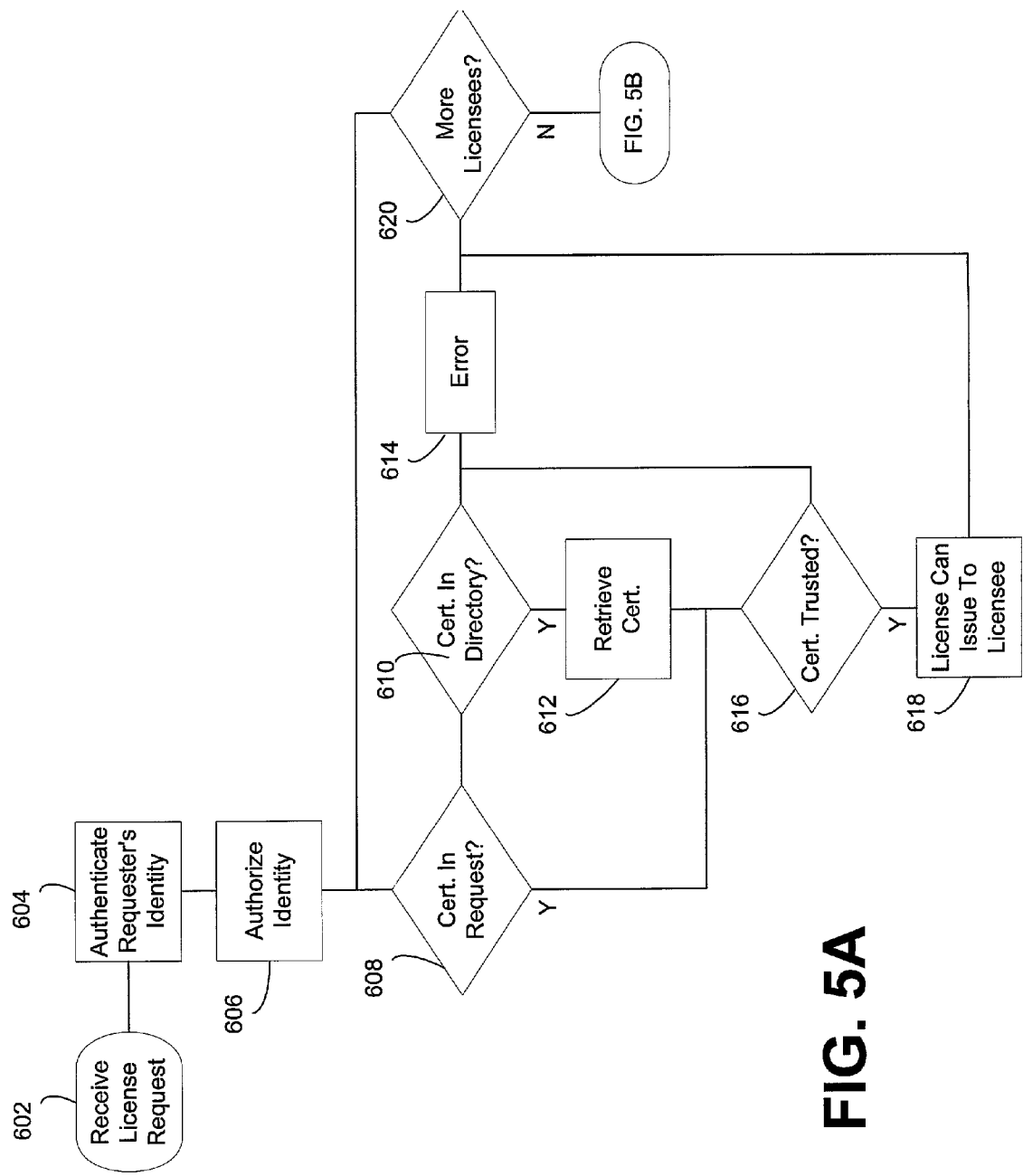

FIGS. 5A and 5B provide a flowchart of a preferred embodiment of a method 600 according to the invention for licensing rights managed digital content. According to the invention, a requesting entity can submit a license request on behalf of one or more potential licensees. The requesting entity may or may not be one of the potential licensees. A potential licensee can be a person, a group, a device, or any other such entity that can consume the content in any fashion. The method 600 will now be described with reference to an embodiment wherein a DRM server processes the license request, though it should be understood that license request processing could also be performed on, and licenses issued by, the client.

At step 602, a license issuing entity, such as a DRM server, for example, receives a license request. Preferably, a license request includes either a public key certificate or an identity for each of one or more requested licensees.

At step 604, the requesting entity (i.e., the entity making the license request) is authenticated. According to one embodiment of the invention, the license issuing entity can be configured to use protocol (e.g., challenge-response) authentication to determine the identity of the requesting entity, or it can be configured to not require authentication of the requesting entity (also known as "allowing anonymous authentication"). Where authentication is required, any type of authentication scheme may be used (e.g., the challenge-response scheme mentioned above, a user-id-and-password scheme such as MICROSOFT.NET, PASSPORT, WINDOWS authorization x509, etc.). Preferably, anonymous authentication is allowed, as well as supporting any protocol authentication scheme supported by integrated information systems. The result of the authentication step will be an identity, such as an "anonymous" identity (for anonymous authentication), or a personal account identity, for example. If the license request cannot be authenticated for any reason, an error is returned and no license is granted.

At step 606, the authenticated identity is authorized—i.e., it is determined whether the identity authenticated at step 604 is allowed to request a license (either for itself or on behalf of another entity). Preferably, the license issuing entity stores a list of entities that are allowed (or not allowed) to request a license. In a preferred embodiment, an identity in this list of identities is the identity of the entity making the request, rather then the identity of the entity for whom a license is being requested, though it could be either. For example, a personal account identity may not be allowed to directly make a license request, but a trusted server process may make a license request on behalf of such an entity.

According to the invention, the license request can include either a public key certificate or an identity for each potential licensee. If a license is requested for only one licensee, only one certificate or identity is named. If a license is requested for a plurality of licensees, a certificate or an identity can be named for each potential licensee.

Preferably, the license issuing entity has a public key certificate for each valid licensee. However, an application 302 may want to generate a license for a given user, but the application 302 might not have access to the public key certificate for that user. In such a situation, the application 302 can specify the identity of the user in the license request and, as a result, the license issuing entity can invoke a registered certificate plug-in module that performs a lookup in a directory service and returns the appropriate user's public key certificate.

If, at step 608, the license issuing entity determines that the public key certificate is not included in the license request, then the issuing entity uses the specified identity to perform a lookup in a directory service or database for the appropriate public key certificate. If, at step 610, the issuing entity determines that the certificate is in the directory, then, at step 612, the certificate is retrieved. In a preferred embodiment, a certificate plug-in is used to retrieve public key certificates from a directory service over by way of a directory access protocol. If a certificate cannot be found for a given potential licensee, either in the request or in the directory, then the license server does not generate a license for that potential licensee and, at step 614, an error is returned to the requesting entity.

Assuming the license issuing entity has a public key certificate for at least one potential licensee, then, at step 616, the issuing entity validates the trust of the licensee certificates. Preferably, the issuing entity is configured with a set of trusted certificate issuer certificates, and it determines whether the issuer of the licensee certificate is in the list of trusted issuers. If, at step 616, the issuing entity determines that the issuer of the licensee certificate is not in the list of trusted issuers, then the request fails for that licensee, and an error is generated at step 614. Thus, any potential licensee whose certificate is not issued by a trusted issuer would not receive a license.

Additionally, the issuing entity preferably performs digital signature validation on all entities in the certificate chain going from the trusted issuer certificates to the individual licensee public key certificates. The process of validating the digital signatures in a chain is a well-known algorithm. If the public key certificate for a given potential licensee does not validate, or a certificate in the chain does not validate, the potential licensee is not trusted, and a license, therefore, is not issued to that potential licensee. Otherwise, at step 618, a license can issue. The process repeats at step 620 until all entities for which a license has been requested have been processed.

As shown in FIG. 5B, the license issuing entity proceeds to validate the signed rights label 308 that is received in the license request. In a preferred embodiment, the issuing entity can use a rights label plug-in, and a back-end database to store on the server a master copy of every rights label signed by the issuing entity. The rights labels are identified by the GUID placed into them at publication. At license time (at step 622), the issuing entity parses the rights label input in the license request and retrieves its GUID. It then passes this GUID to the rights label plug-in, which issues a query against the database to retrieve a copy of the master rights label. The master rights label could be more up to date than the copy of the rights label sent in the license request, and it will be the rights label used in the request in the steps below. If no rights label is found in the database based upon the GUID, the issuing entity checks its policy, at step 624, to determine whether it is still allowed to issue a license based on the rights label in the request. If the policy does not allow this, the license request will fail at step 626, and an error will be returned to the API 306 at step 628.

At step 630, the license issuing entity validates the rights label 308. The digital signature on the rights label is validated and, if the license issuing entity is not the issuer of the rights label (the entity that signed it), then the license issuing entity determines whether the issuer of the rights label is another trusted entity (e.g., an entity with which the license issuing entity is enabled to share key material). If the rights label does not validate, or it is not issued by a trusted entity, then the license request fails at step 626, and an error will be returned to the API 306 at step 628.

After all the validations have occurred, the license issuing entity translates the rights label 308 into a license for each of the approved licensees. At step 632, the license issuing entity generates a respective rights description for the license to be issued to each licensee. For each licensee, the issuing entity evaluates the identity named in the public key certificate of that licensee against the identities named in the rights description in the rights label. The rights description assigns to every right or set of rights, a set of identities that can exercise that right or set of rights in a license. For every right or set of rights to which this licensee's identity is associated, that right or set of rights is copied into a new data structure for the license. The resulting data structure is the rights description in the license for the particular licensee. As part of this process, the license issuing entity evaluates any preconditions that might be associated with any of the rights or sets of rights in the rights description of the rights label. For example, a right may have a time precondition associated with it that limits the license issuing entity from issuing a license after a specified time. In this case the issuing entity would need to check the current time and, if it is past the time specified in the precondition, then the issuing entity would not be able to issue that right to the licensee even if that licensee's identity were associated with that right.

At step 636, the issuing entity takes (PU-DRM(DES1)) and (DES1(CK)) from the rights label 308 and applies (PR-DRM) to obtain (CK). The issuing entity then re-encrypts (CK) using (PU-ENTITY) the licensee's public key certificate to result in (PU-ENTITY(CK)). At step 638, the issuing entity concatenates the generated rights description with (PU-ENTITY(CK)) and digitally signs the resulting data structure using (PR-DRM). This signed data structure is the license for this particular licensee entity.

When, at step 640, the issuing entity determines that there are no more licenses to generate for the particular request, it will have generated zero or more licenses. The generated licenses are returned to the requesting entity, at step 642, along with the certificate chain associated with those licenses (e.g., the server's own public key certificate as well as the certificate that issued its certificate and so on).

In a preferred embodiment of a system according to the invention, a plurality of licensor keys can be used. In such an embodiment, the content key (CK) that travels encrypted through the rights label 308 and into the license can actually be any arbitrary data. One particularly useful variation is to use a plurality of separate, encrypted, content keys (CK) associated, respectively, with different rights or different principals in the rights description. For example, the digital version of songs on an album could all be encrypted with different keys (CK). These keys (CK) would be included in the same rights label, but one principal may have the right to play one of the songs (e.g., he might only have rights to get the one key in his license), while a second principal might have rights to play all the songs (she would have rights to get all keys in her license).

Preferably, a system according to the invention enables publishing applications/users to name groups or classes of licensees in a rights label 308. In such an embodiment, the license issuing entity will evaluate any groups/classes named in the rights label to determine if the current licensee identity is a member of those groups classes. If membership in a named group/class is found, the issuing entity could add the rights or set of rights associated with the group/class to the rights description data structure used for the license.

In a preferred embodiment of the invention, the publish and license protocol interfaces in the DRM server support authentication and authorization of the calling application or user, and the administrative console for the DRM server allows an administrator to generate an access control list for both the licensing and publishing interfaces. This enables the customer of the server to apply policy over which users/applications are allowed to either publish, license, or both.

Exemplary Platform and Its Relationship to Identities and Licenses

Figure 6:
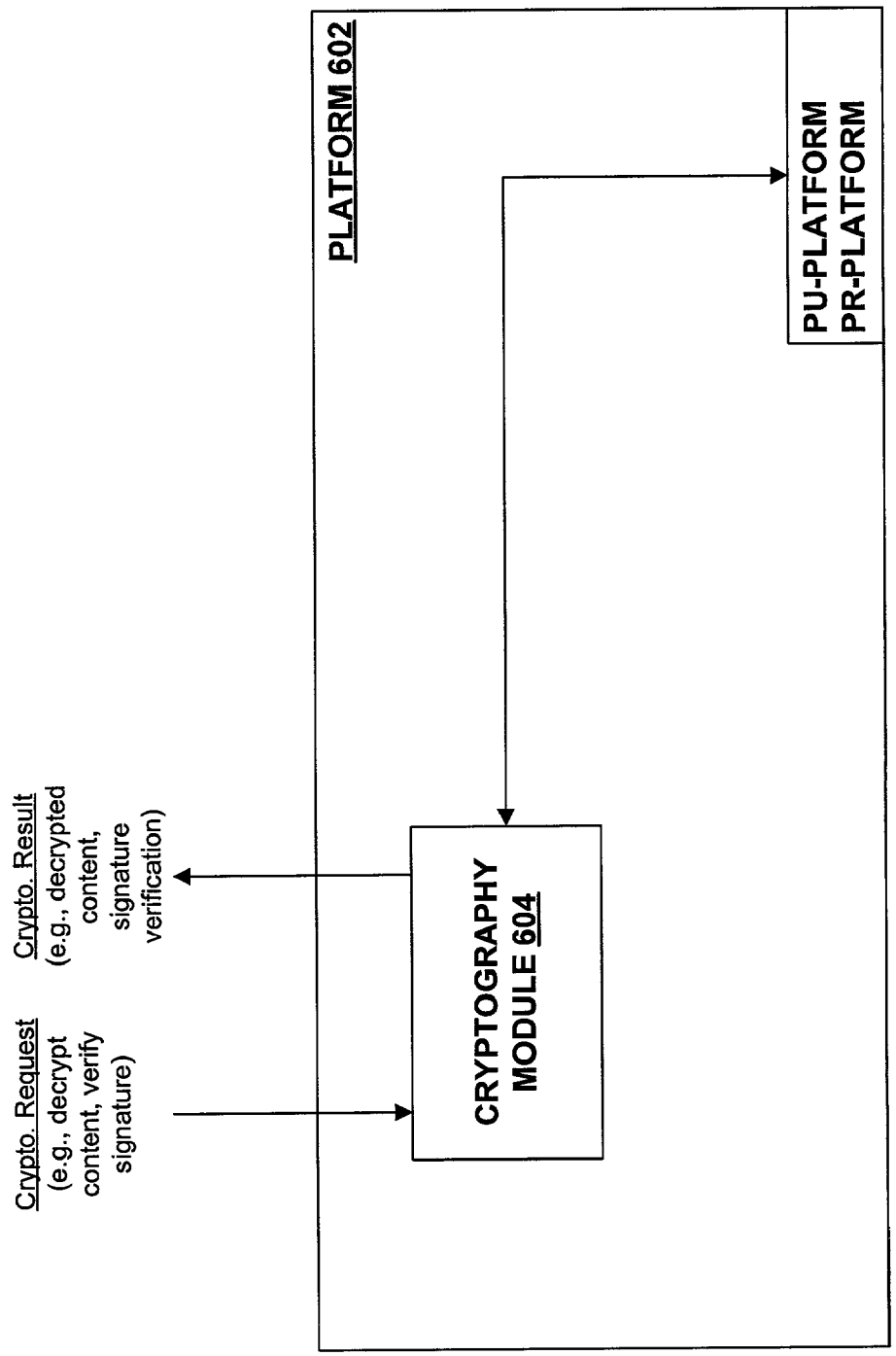
FIG. 6 is a block diagram of a platform with cryptographic functions that support a rights management system in accordance with features of the invention.
Figure 7:
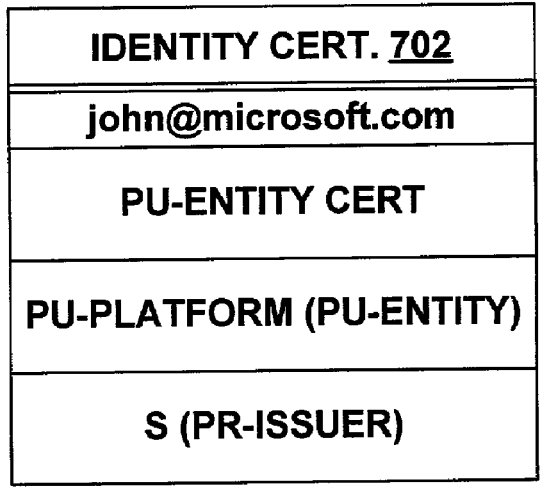
FIG. 7 is a block diagram of an exemplary identity certificate in accordance with aspects of the invention.
Figure 8:
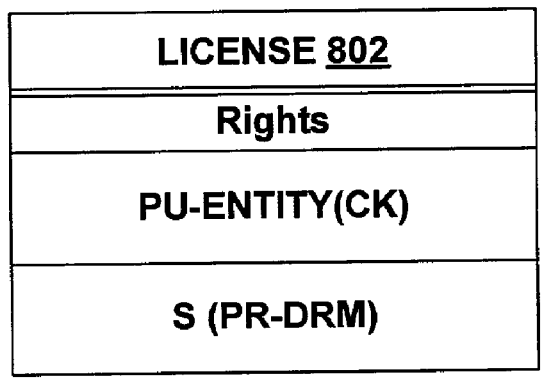
FIG. 8 is a block diagram of an exemplary license in accordance with aspects of the invention.

The trust model that the present invention supports is based on the notion that protection of rights-managed content is dependent on protection of the keys that protect the content. As discussed above, content is encrypted with a symmetric key CK that the user provides. Since the ultimate consumer of the content needs CK in order to decrypt the content, one problem that a DRM system must solve is how to provide this key to the content consumer in a secure way, so that the key cannot be viewed during transport, and also so that the consumer cannot misuse the key. FIGS. 6-8 shows structures that can be used to provide the key CK to the user in a secure manner.

FIG. 6 shows an exemplary platform 602 that provides cryptographic services. Platform 602 includes a public/private key pair PU-PLATFORM/PR-PLATFORM, and a cryptographic module 604 that applies the key pair to perform cryptographic services. The function of platform 602 is to perform these cryptographic services without revealing the private platform key PR-PLATFORM. Thus, an object that employs platform 602 provides cryptographic requests (e.g., requests to decrypt content, requests to verify digital signatures) and receives cryptographic results (e.g., decrypted content, signature verifications). Because platform 602 provides the results without revealing the private platform key PR-PLATFORM to the user, platform 602 is sometimes called a "black box."

Platform 602 may have various implementations, and any of these implementations may be used in accordance with the invention. For example, platform 602 may be a tamper-resistant piece of software that contains the private platform key in hidden form and uses code obfuscation techniques to complicate attempts by a hacker to learn the private key by analyzing the software. As another example, platform 602 may be a self-contained integrated circuit with a physical barrier that protects the circuit from analysis and/or causes the circuit to self-destruct if penetration of the barrier is attempted. It is anticipated that each computer on which rights-managed content is usable will have one such platform with a unique key pair. Any platform that performs the cryptographic functions described above can be used in accordance with the invention, regardless of the means used to protect the private key; however, the means that are used to protect the private key affect the trustworthiness of the platform, as described below in connection with FIG. 9.

FIG. 7 shows an exemplary identity certificate 702. Identity certificate 702 defines the identity for a persona. In this case, the person is john@microsoft.com; thus, whenever john@microsoft.com wants to obtain a license for rights-managed content, identity certificate 702 is the data structure that john@microsoft.com uses to identity himself to the DRM server that will prepare that license. Identity certificate 702 contains: a public key certificate for the public key PU-ENTITY; the private key PR-ENTITY encrypted by the public key of the platform PU-PLATFORM; and the digital signature of the issuer of identity certificate 702 (which is created with the private key of that issuer, PR-ISSUER).

As discussed above in connection with FIGS. 4, 5A and 5B, a certificate containing PU-ENTITY is passed up to the DRM server during a license request. Identity certificate 702 is an example of such a certificate. Thus, PU-ENTITY is the key that is used to encrypt the content key CK at step 636 (shown in FIG. 5B). Inasmuch as identity certificate 702 will be installed on a user's machine, it is important that the user not have direct access to PR-ENTITY, since anyone in possession of PR-ENTITY could decrypt the content key CK in a license and compromise the protection of the content. Thus, identity certificate 702 stores PR-ENTITY encrypted by PU-PLATFORM, so that platform 602 can decrypt PR-ENTITY when it is needed to recover CK from a license. Inasmuch as anyone in possession of PR-ENTITY has the power to steal the content, the digital signature in identity certificate 702 represents the certificate issuer's promise that PR-ENTITY has been protected and has not been distributed to an insecure platform.

It should be noted that identity certificate 702 supports a decoupling of a user's computer from the user's identity. Thus, john@microsoft.com can have his identity installed on several computers simply by having the certificate re-created for several platforms (although there may be an identity platform that limits the number of certificates that can be issued for the same identity, or the type of platform on which such certificates can be installed). These various certificate would be the same, except that the public key PU-PLATFORM that encrypts PR-ENTITY in the certificate would differ from platform to platform. Additionally, identity certificate 702 supports the creation of group identities. For example, the auto parts department of a car company can have an identity; thus, documents can be licensed to, and consumable, by the entire auto parts department simply by having everyone in the auto parts department install an instance of the auto parts identity certificate on their computers.

FIG. 8 shows a license 802 that is issued to an identity. License 802 comprises: rights (i.e., the rules that govern what can be done with the content and the circumstances under which the content can be consumed); the content key CK encrypted by PU-ENTITY; and a signature created with the private key PR-DRM of the DRM server that issued the license. As can be seen in FIG. 8, CK can only be recovered from the license using the private identity key PR-ENTITY to decrypt PU-ENTITY(CK). Thus, in practice, one must have an identity certificate 702 that contains PR-ENTITY in order to use the license, since this is the only way to recover CK from the license. Moreover, since PR-ENTITY in identity certificate 702 is encrypted with the public platform key PU-PLATFORM, the identity certificate must be specifically created for the platform 602 on which the content is being consumed. Thus, in order to use the license to consume content, the user must have a license issued to his identity, and must have an identity certificate issued to the platform on which the content is being consumed.

Model of Trust

Figure 9:
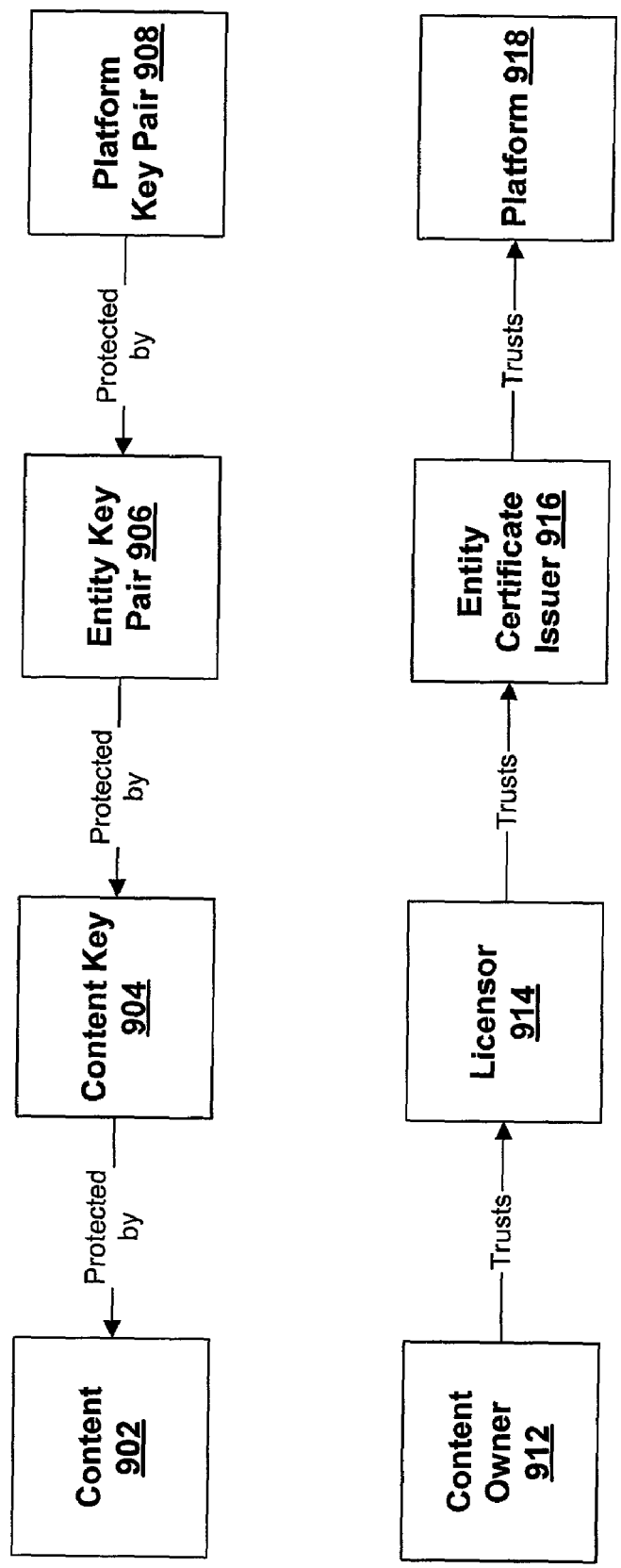
FIG. 9 is a block diagram showing the relationship between key protection layers and a chain of trust.

The DRM system described above protects content through several layers of keys. These layers of keys, in turn, represent a chain of trust relationships leading from the content owner to the platform on which the content will ultimately be used. FIG. 9 shows the relationship between the various keys and the chain of trust that these keys imply.

As shown in FIG. 9, content 902 is protected by content key 904 (called CK in the preceding discussion). Content key 904, in turn, is protected by an identity key pair 906 (PU-ENTITY/ PR-ENTITY). The private identity key, in turn, is protected a platform key pair 908 (PU-PLATFORM, PR-PLATFORM). As discussed above, the private identity key (PR-ENTITY) is preferably stored on a computing device within an identity certificate and encrypted by the computing device's public platform key—i.e., as PU-PLATFORM(PR-ENTITY)—so that PR-ENTITY can only be decrypted by PRPLATFORM.

It will readily be appreciated that any weakness in the chain of protection from content 902 to platform key pair 908 will compromise the security of content 902. Thus, if content key 904 becomes publicly known, then anyone can decrypt content 902. Likewise, if the private identity key becomes publicly known, then anyone can decrypt content key 902 and, in turn, decrypt content 902. Finally, if the private platform key becomes publicly known, then, anyone can decrypt the private identity key, and thus the content key, and thus the content. Accordingly, the security of granting access to content through these layers of encryption is dependent on the content key, the private identity key, and the private platform key not being compromised.

Accordingly, the ability of each of these keys to be protected, is established through a chain of trust, which is shown in elements 912 through 918 of FIG. 9. When content owner 912 publishes the content, the content owner creates the content key CK and shares this key with the licensor (i.e., the DRM server) at the time that the rights label is presented for signing. Thus, inasmuch as content owner does not want to grant unfettered access to the content, content owner 912 effectively trusts licensor 914 to avoid compromising the content key—i.e., to give out the content key only under controlled circumstances. Similarly, when the licensor issues a license to a particular identity (which, necessarily, involves dispensing the content key in a manner such that it can be decrypted using the private identity key), the licensor is essentially trusting that the issuer 916 of the identity certificate has issued the identity certificate such that the private identity key can be used only under the appropriate controlled conditions. In turn, when the identity certificate issuer 916 issues an identity certificate to a given platform 918 (thereby enabling platform to use the private identity key, PR-ENTITY), the issuer 916 is trusting that platform 918 will not misuse the private key.

No rights management system is perfect at protecting content from misuse; any rights management system can be broken by an adversary with sufficient time, skill, resources, and motivation. However, the nature of a rights management system is such that a content owner 912 can decide whether the various entities involved in the chain of handling (e.g., licensor 914, identity certificate issuer 916, and platform 918, in this example) will protect their respective keys with sufficient competency and integrity that the content owner can place its trust in these entities. It can readily be appreciated that the security of content is thus directly dependent on which entities one trusts, and which entities one does not trust.

As described below, the invention provides a system and method for issuing content based on establishing (or denying) particularly types of trust relationships.

Trust Considerations Among Plural Identity Servers

As discussed above, a security scheme may be defined, in part, by deciding whom to trust and whom not to trust. One aspect of these trust decisions is for the licensor to decide whether that licensor trusts the identity certificates that are issued by a particular issuer of such certificates. This trust decision is important, since the licensor will encrypt the content key with the public key of the identity certificate (PU-ENTITY), and thus the entire world will have access to the encrypted content unless measures are taken to keep the corresponding private key (PR-ENTITY) from falling into the wrong hands.

Figure 10:
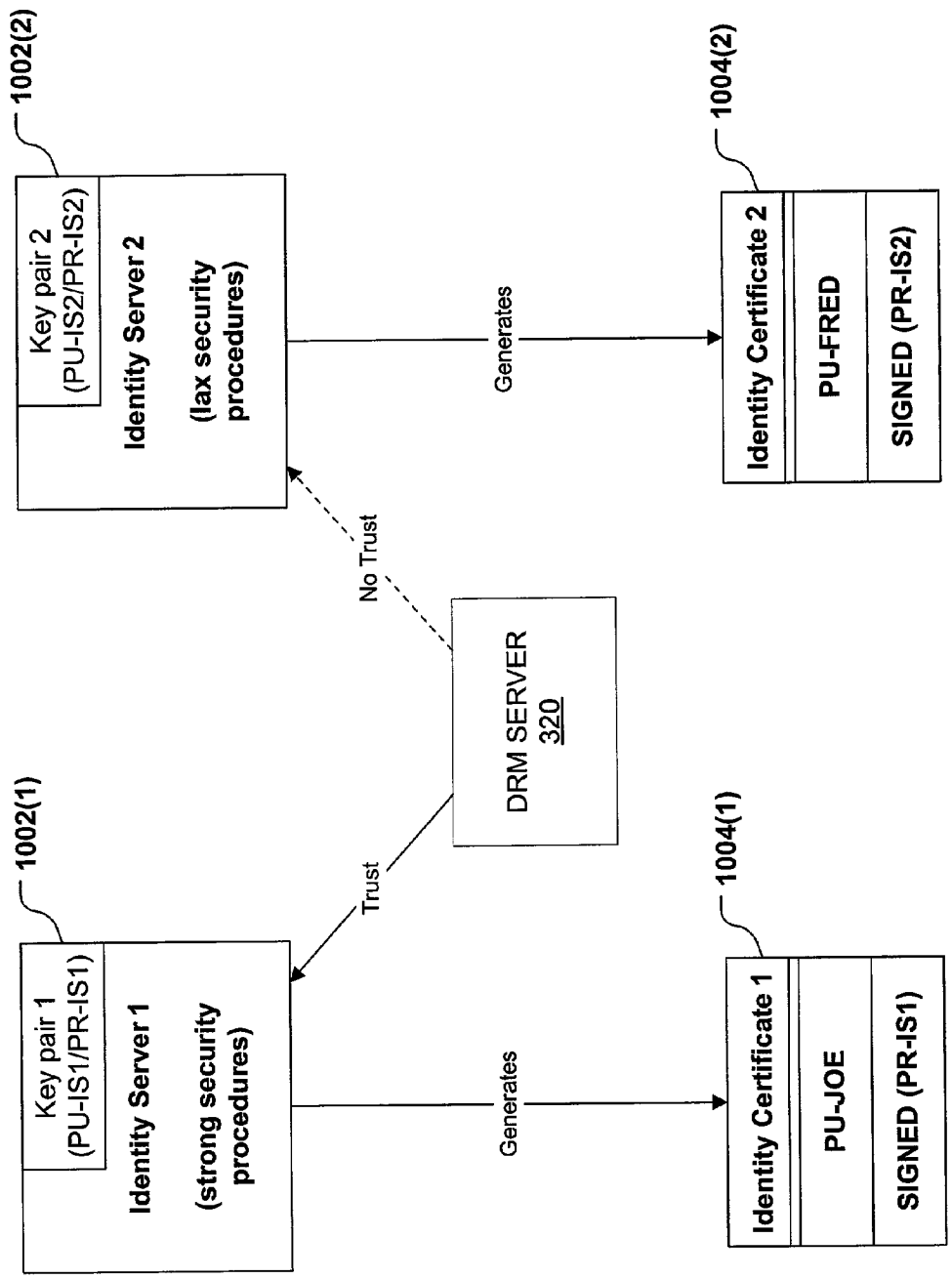
FIG. 10 is a block diagram showing the selective trust of identity servers in accordance with aspects of the invention.

FIG. 10 shows a plurality of identity servers 1002(1) and 1002(2) that issue identity certificates 1 and 2 (reference numerals 1004(1) and 1004(2)). In this example, identity certificate 1 is for the entity "Joe," and identity certificate 2 is for the entity "Fred". Such identities may sometimes be referred to as "personas." While the example personas shown are individuals, it will be understood from the preceding discussion that an identity certificate can also define a "group entity" or "group persona" (such as the "auto parts department"). Each identity certificate is associated with a (relatively) unique key pair, and the identity certificate itself contains the public portion of that key pair. Thus, identity certificate 1 contains the public key PU-JOE, and identity certificate 2 contains the public key PU-FRED. (As discussed above in connection with FIG. 7, an identity certificate may also contain the private portion of the key pair, although preferably not in the clear, since the user should not have unfettered access to the private key.) Additionally, each identity certificate includes a signature. The signature is taken over (at least) the public key. Each certificate includes the signature of its issuer. Thus, identity certificate 1 is signed by the private key of identity server 1 (PR-IS1), and identity certificate 2 is signed by the private key of identity server 2 (PR-IS2). When identity servers 1 and 2 sign these identity certificates, they are essentially asserting that they will protect the private keys for these identity certificates from being compromised.

Some identity servers may be better (or worse) at ensuring the security of the private keys for the entities that they create. In the example of FIG. 10, identity server 1 has "strong security procedures," and identity server 2 has "lax security procedures." The relative strength (or laxity) of these procedures could take any form. For example, perhaps identity server 1 installs the private key only on devices that are known to have physically secure platform keys, whereas identity server 2 may hand out the private key in the clear without verifying the trustworthiness of the recipient of such a key, and/or without verifying the type of platform on which the private key will be installed. These are some examples of how different identity servers may differ in the relative effectiveness of their security procedures.

Due to these differences in security among identity servers, a DRM server may decide that some identity servers are trustworthy and that some are not. Thus, a DRM server may issue a license only to those identity certificates that have been signed by identity servers that the DRM server trusts. In the example of FIG. 10, DRM server 320 trusts identity server 1 but does not trust identity server 2, since server 1 has strong security procedures but server 2 has lax security procedures. Accordingly, DRM server 320 will issue licenses only for those identity certificates that have been signed with the private key of identity server 1.

It should be noted that, while FIG. 10 shows server 1 and server 2 as having "strong" and "lax" security procedures, respectively, the selective trust of identity servers need not be based on "lax" versus "strong." For example, servers 1 and 2 may simply have different features relating to security, authentication, etc., even if it cannot be said that one server's security features are categorically "stronger" than the other's. DRM server 320, nevertheless, is entitled to make a choice about which identity servers it will trust and which ones it will not. For example, two systems may both have strong security procedures but may authenticate the user differently—e.g., one system may require a smart card, and another system may require an X509 certificate—and this difference may be important to the entity that operates DRM server 320. Thus, while it should be understood that choosing to trust an identity server based on the strength of its security may be a typical use of the invention, it is merely one of many reasons why DRM server 320 may choose to trust some identity servers but not others.

Figure 11:
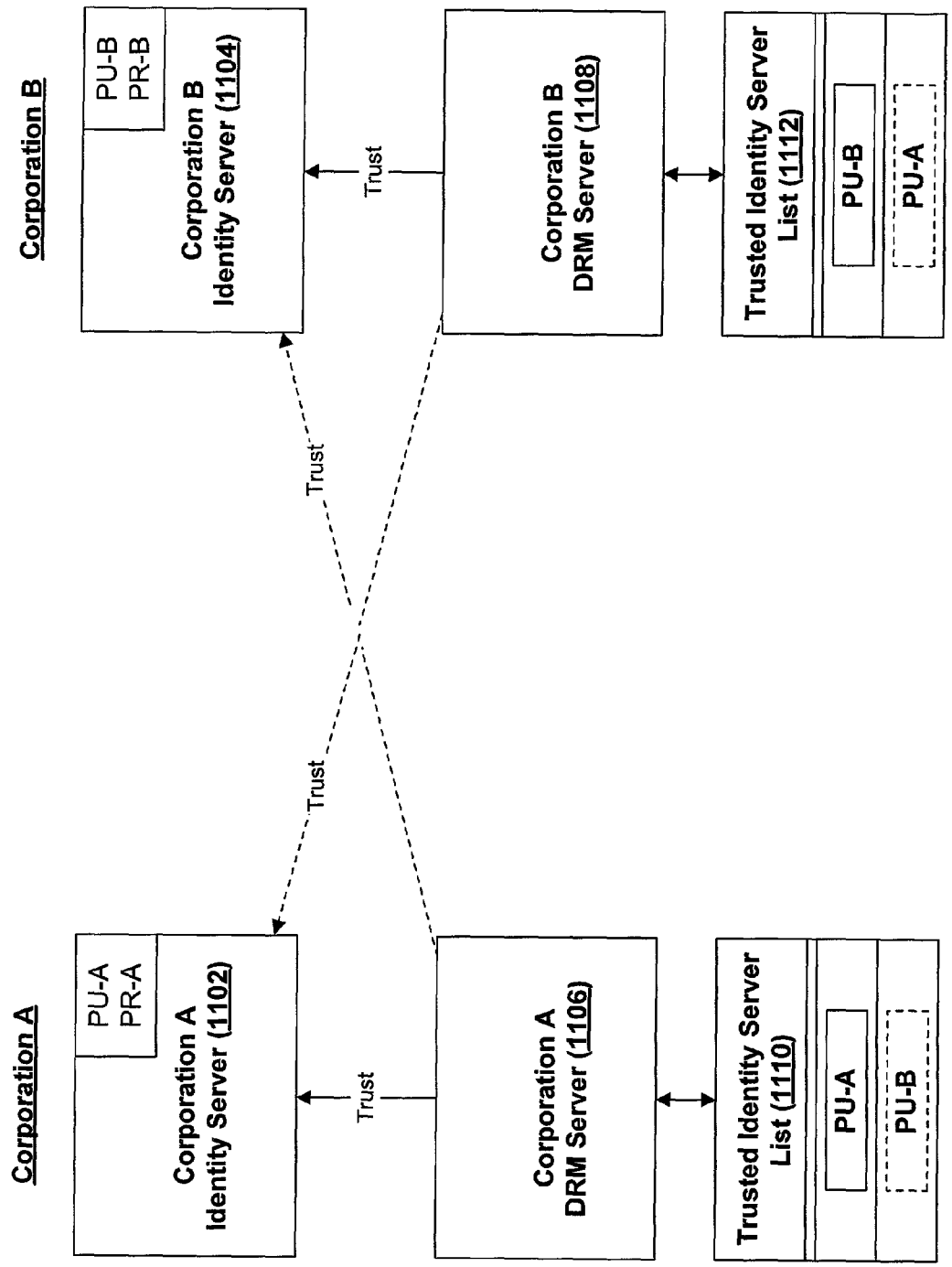
FIG. 11 is a block diagram of the exemplary use of trusted persona domains to permit sharing of documents between two organizations.

FIG. 11 shows an example where the decision of which identity server(s) can be trusted affects the way in which two organizations can share documents. Two companies—"Company A" and "Company B"—want their employees to be able to share documents, and access to those documents is controlled by a DRM system. Company A's employees have identities that are issued by company A's identity server 1102, and company B's employees have identities that are issued by company B's identity server 1104. Additionally, each company has its own DRM server that issues licenses to view DRM-controlled documents. Typically, company A's DRM server 1106 would be set up to trust company A's identity server 1102, and company B's DRM server 1104 would be set up to trust company B's identity sever 1108.

In a typical scenario, an employee of company A would present a signed rights label to company A's DRM server 1106 in order to obtain a license for a piece of content. The employee has an identity (i.e., an identity certificate, with a key pair PU-ENTITY/PR-ENTITY) that has been issued by company A's identity server 1102. Assuming that the signed rights label allows a license to be issued to this employee, then company A's DRM server 1106 will be able to prepare a license for the employee's identity certificate, since company A's DRM server 1106 trusts company A's identity server 1102. However, suppose that an employee of company A publishes a piece of content and wants to give an employee of company B permission to use the document. When the company A employee creates a rights label for the content, that rights label may name the persona of a company B employee as one of the permissible licensees of the content. However, if the company B employee contacts company A's DRM server 1106 to obtain a license, company A's DRM server 1106 will not be able to issue a license for that employee's identity certificate, since company B's employees have identity certificates issued by company B's identity server 1104, and company A's DRM server 1106 does not (yet) trust company B's identity server 1104. (As discussed below in connection with FIGS. 13-14, it would be possible to enable company B's DRM server to issue licenses for content that has been published at company A, although doing so requires that company A and company B share their private keys, which may be undesirable in some circumstances.)

The solution is to establish a trust relationship between company A's DRM server 1106 and company B's identity server 1104. Preferably, company A takes steps to satisfy itself that company B's identity server 1104 takes appropriate security measures when it issues identities. Assuming that company A becomes satisfied that company B's identity server meets its security standards, then company A's DRM server 1106 can trust company B's identity server 1104. This trust relationship enables company A's employees to publish documents that can be licensed to company B's employees. Similarly, company B's DRM server 1108 can trust company A's identity server 1102, thereby allowing company B's employees to publish documents that can be licensed to company A.

Trust relationships can be established by having each DRM server maintain a trusted identity server list 1110 and 1112. Each identity server has a key pair, and each identity server can be identified by the public portion of its key pair. Company A's identity server has the key pair PU-A/PR-A, and company B's identity server has the key pair PU-B/PR-B. Each identity certificate preferably contains the public key certificate of the identity server that issued the certificate; thus, given an identity certificate, a DRM server can determine whether it trusts the identity server that issued the identity certificate by comparing the identity server public key mentioned in the identity certificate with the public keys on the list of trusted identity servers. (An identity server may also have a separate identifier that it includes in the identity certificates that it issued. The DRM server can determine which identity server issued the identity certificate based on the public key, the identifier, or both.) The list of trusted identity servers can be referred to as a "trusted persona domain."

Thus, company A can enable its employees to publish content for company B's employees by putting company B's identity server on company A's trusted list (assuming that company B's employees have identity certificates issued by company B's identity server). Likewise, company B can add company A's identity server to its trusted list. Thus, FIG. 11 shows the public key PU-B being added to company A's trusted list 1110, and the public key PU-A being added to company B's trusted list 1112.

Exclusion of Certain Certificate Issued by Otherwise Trusted Identity Servers

As discussed above, a DRM server may selectively trust/distrust certain identity servers. One noteworthy refinement of that selective trust/distrust model concerns the exclusion of particular identities from the general trust that is offered to a particular identity server. For example, a DRM server may generally trust a particular identity server, but may not want to issue licenses to certain certificates that are registered to particular e-mail addresses, domains, etc. One example of this—although not the only example—is the case of identity servers that issue identities to the public based on e-mail addresses; MICROSOFT.NET PASSPORT is an example of such an identity server.

Figure 12:
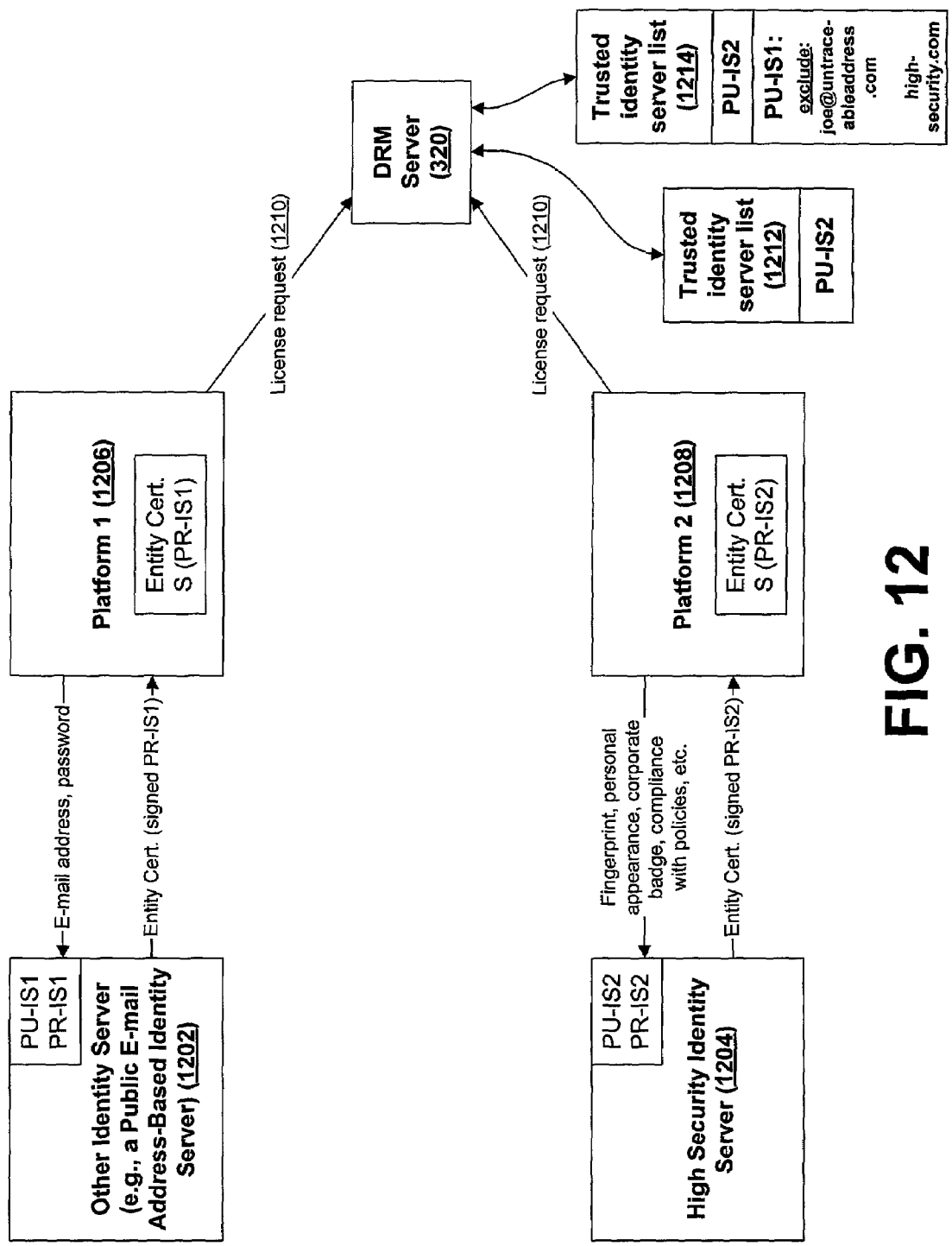
FIG. 12 is a block diagram of an exemplary architecture that includes a public e-mail based identity server in accordance with aspects of the invention.

FIG. 12 shows identity servers 1202 and 1204. Identity server 1202 may, for example, be a public e-mail addressed based identity server that issues identity certificates based on an e-mail address and passport provided by a user. For example, a user may have pre-registered an e-mail address (e.g., xxx@hotmail.com) and password; identity server 1202 may simply prompt the user for the e-mail address and password and issue an identity certificate if the user enters the correct e-mail address/password combination—without demanding any more rigorous authentication of the user. Public e-mail address-based identity server 1202 may also have the security disadvantage that it may, in some cases, install an identity certificate on any platform the user requests without regard to the security capabilities of that platform. This technique may be considered a relatively insecure method of issuing identity certificates.

By contrast, identity server 1204 is a high-security identity server. Identity server 1204 requires a relatively rigorous check before issuing an identity certificate. For example, a user may have to personally present himself (and his computer) to a (human) system administrator, who causes server 1204 to install an identity certificate on the user's computer if he is satisfied that the computer is sufficiently secure and that the user is entitled to such an identity. The user may have to authenticate himself using a fingerprint, smart card, etc. Or, if server 1204 is the identity server for a company, the user may have to access server 1204 through the corporate intranet, rather than through the Internet. Thus, it can be seen that high-security server 1204 is relatively more secure than e-mail address-based server 1202.

In the example of FIG. 12, platform 1 (reference numeral 1206) obtains an identity certificate from the e-mail based identity server, and platform 2 (reference numeral 1208) obtains an identity certificate from the high-security identity server. As discussed above, the issuer of these certificates can be determined from the certificate itself, since each identity certificate incorporates the public key certificate of its issuer and is signed by the issuer's private key. (In the example of FIG. 12, public e-mail address-based server 1202 has the key pair PU-IS1/PR-IS1, and high-security identity server 1204 has the key pair PU-IS2/PR-IS2). Thus, when platforms 1 and 2 attempt to obtain licenses for some content by sending license requests 1210 (including their respective identity certificates) to DRM server 320, the DRM server can determine which identity server issued the identity certificate and thus determine whether it trusts the identity server that issued the identity certificate. As discussed above, DRM server 320 makes this decision by consulting its list of trusted identity servers. FIG. 12 shows two alternative example lists 1212 and 1214. (It is not expected that DRM server 320 will use two trusted lists at the same time; rather these lists are both shown in FIG. 12 as alternative examples of lists that DRM server 320 might use).

In the first example where list 1212 is used, DRM server 320 trusts high-security identity server 1204 (because that server's public key certificate (PU-IS2) is on the trusted list 1212), but DRM server 320 does not trust e-mail address-based server 1202 under any circumstances.

In the second example where list 1214 is used, DRM server 320 trusts high-security identity server 1204, and also trusts e-mail address-based identity server 1202, with some exclusions. In exemplary list 1214, the trust of public e-mail based identity server_02 excludes certificate issued to a particular identity (joe@untraceableaddress.com), or a particular domain name (all addresses having the domain name high-security.com). For example, joe@untraceableaddress.com may be a person who is known as a content thief (e.g., a disgruntled former employee of the company that operates DRM server 320), so DRM server 320 does not trust him. The reason for which one might want to exclude an entire domain name is somewhat counter-intuitive: Suppose that high-security server 1204 is a corporate identity server and it issues identities to employees of the form xxx@high-security.com. While the corporation trusts its own employees, it may wish to trust them only if they actually use identity certificates obtained from the corporation's identity server 1204 (due to that server's stronger authentication procedures or ability to enforce corporate policy). The corporation may presume that any employee who wants to identify himself through the (weaker security) server 1202 may be attempting to circumvent some policy of the company. Putting high-security.com on the exclusion list ensures that people who can obtain identities through high-security server 1204 will do so, while also allowing other people to authenticate themselves using e-mail address-based server 1202.

While FIG. 12 and the preceding discussion describe the use of an exclusion list for a public e-mail-based identity server, it should be understood that the concept of an exclusion list can be applied to any identity server. For example, company 1's DRM server may trust identities that have been issued by company 2's identity server, but company 1 may want to force its own employees to obtain identities through it's own server. Thus, company 1's DRM server can maintain an exclusion list for company 2's identity server, such that any certificate that is issued by company 2's identity server but names an e-mail address of the form xxx@company1.com is excluded from that trust (assuming that company 1's employees have e-mail addresses in the domain company1.com).

Issuing a License Based on Another Server's Rights Label

As described above, a user generally obtains a license from the same DRM server that signed the rights label on which the license is based. One reason for this is that the license must include the content key (CK), but the content key is stored in the license encrypted by the DRM server's public key, PU-DRM. Thus, only the DRM server that possesses the corresponding private key, PR-DRM, can obtain the key CK in order to create the license. (In one embodiment, a symmetric key DES1 is used such that the signed rights label contains: DES1(CK), and PU-DRM(DES1). The effect, however, is the same; CK can only be recovered by an identity that is in possession of PR-DRM.) However, sometimes it is desirable for one DRM server to be able to issue a license for a piece of content that was published by a different DRM server.

One way to enable such "cross-licensing" of content is for a first server (the server that published the content) to give its private key to another server (the server that will license the content). Care must be taken in sharing the private key. A DRM server's trustworthiness is represented by its private key, and anyone who has the private key can "impersonate" that DRM server (i.e., by signing rights labels and issuing licenses). Thus, the first DRM server's private key should only be shared with the second DRM server if it can be established that the second DRM server will not compromise the private key. Moreover, the transport of the private key preferably takes place in some secure manner, so that the key will not be inadvertently revealed to anyone during transport.

Figure 13:
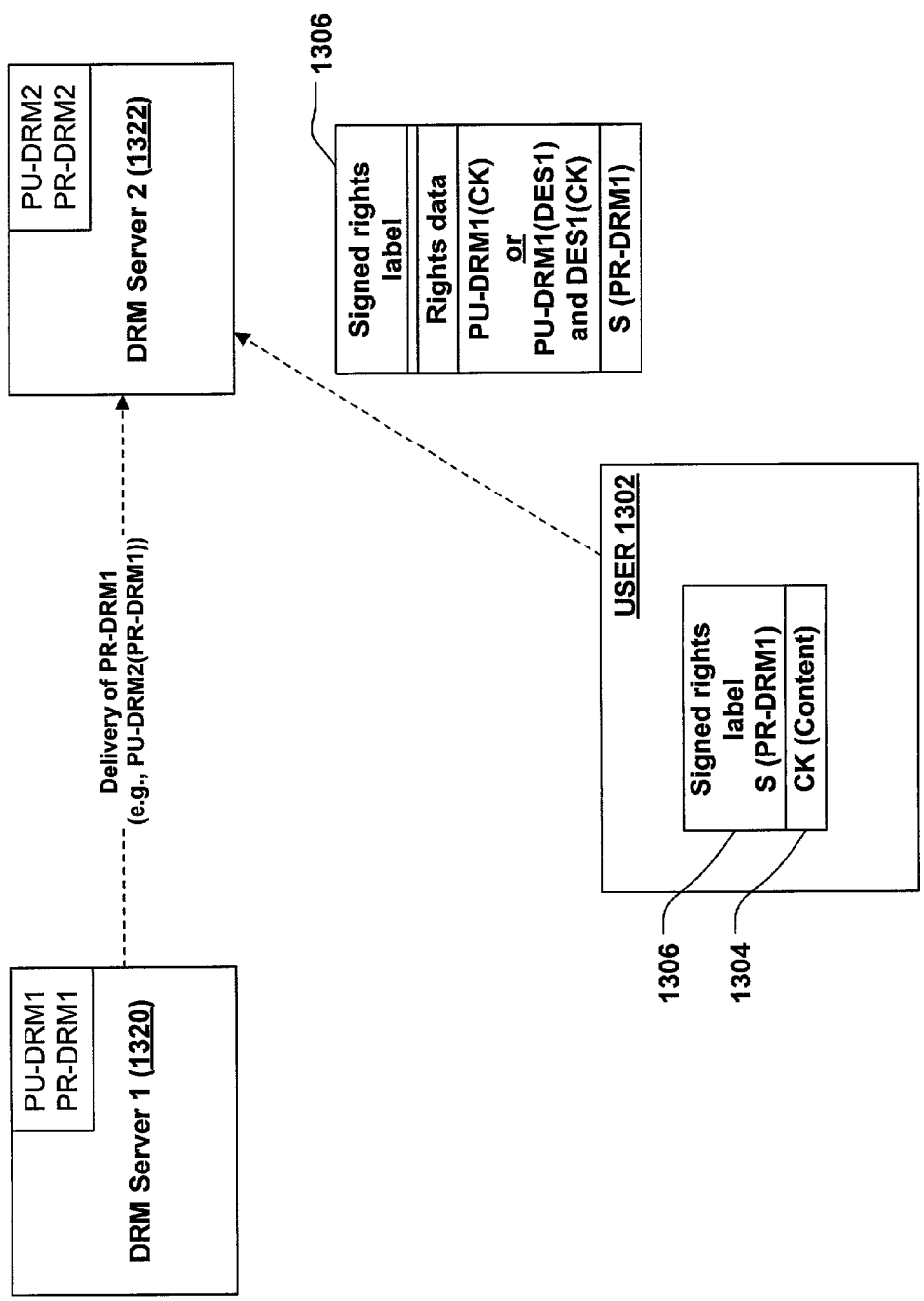
FIG. 13 is a block diagram showing the sharing of a private key to permit a first DRM server to license content on behalf of another DRM server in accordance with aspects of the invention.

FIG. 13 shows an example of two DRM server, and how one DRM server may be used to issue a license based on a rights label that was issued by the other DRM server. DRM server 1 (reference numeral 1320) has a key pair PU-DRM1/

PR-DRM1, and DRM server 2 (reference numeral 1322) has a key pair PU-DRM2/PR-DRM2. A user 1302 has a piece of encrypted content 1304, and a signed rights label 1306 for that content. User 1302 wishes to obtain a license for that content. Signed rights label includes an encrypted form of the content key CK, such that it is possible to obtain CK only by using PR-DRM1 to decrypt the symmetric key DES1, and then applying DES1 to DES1(CK) to obtain CK; in other words, without PR-DRM1, it is not possible to obtain CK in order to issue a license for content 1304. Thus, when user 1302 transmits signed rights label 1306 to DRM server 2, that DRM server will be unable to issue a license for content 1306.

If, however, DRM server 1 shares its private key PR-DRM1 with DRM server 2 (as represented by the dotted line connecting DRM server 1 and DRM server 2), then DRM server 2 will be able to use that private key to obtain CK and issue a license.

FIG. 13 shows one exemplary method of transporting PR-DRM1 from DRM server 1 to DRM server 2. In the example of FIG. 13, PR-DRM1 is encrypted with the public key of DRM server 2, to create PU-DRM2 (PR-DRM1). Thus, PR-DRM1 is protected from public view, and PR-DRM1 can be recovered by decrypting PUDRM2 (PR-DRM1) with DRM server 2's private key, PR-DRM2. It should be understood that there are other secure ways of transporting a private key, and the way depicted in FIG. 13 is just an example. As another example, the private key may be placed on a disk and transported by a trusted courier. The set of private keys that a DRM server has access to defines that server's "trusted document domain."

Figure 14:
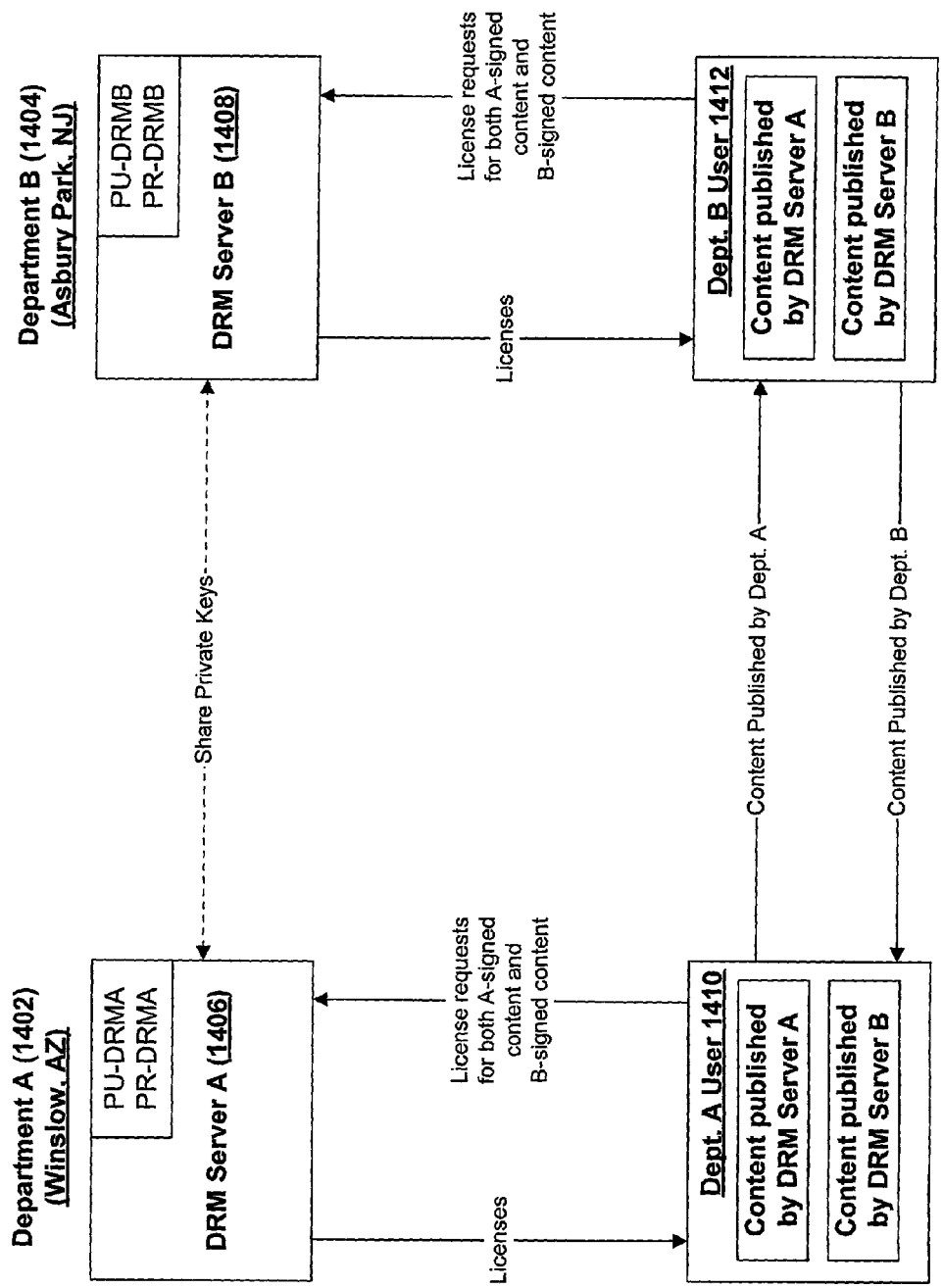
FIG. 14 is a block diagram of the exemplary use of a trusted document domain to permit the cross-licensure of protected content between two corporate departments.

FIG. 14 shows an example in which this type of "cross-licensing" scheme may be useful. Corporation 1400 is spread out geographically in different locations. Department A 1402 is located in Winslow, Ariz., while Department B 1404 is located in Asbury Park, N.J. For practical reasons, each department maintains its own DRM server, 1406 and 1408, respectively. For example, these departments may use DRM server to publish and/or license thousands of documents per day, and it may not be feasible to rely on transporting data across the country in order to perform all of these publishing and/or licensing operations. However, since departments A and B are in the same corporation 1400, it may be for employees of department A to publish content that can be licensed to employees of department B, and vice versa. Thus, users 1410 and 1412 in departments A and B, respectively, each have some content published by DRM server A, and some content published by DRM server B. For example, user 1412 may send user 1410 some content that has been published on DRM server B, and user 1410 may send user 1412 some content that has been published on DRM server A.

Regardless of which server was used to publish the content, each user contacts the server in his own department to obtain a license. Thus, user 1410 requests licenses from department A DRM server 1406, and user 1412 requests licenses from department B server 1408. Each server can issue licenses for any content that was published by that server, since the rights label for such content was generated with that server's public key. Additionally, each server can issue licenses for content published by the other server, as long as servers have shared their respective private keys, PR-DRMA and PR-DRMB.

Process of Validating Trust for License Requests

Figure 15:
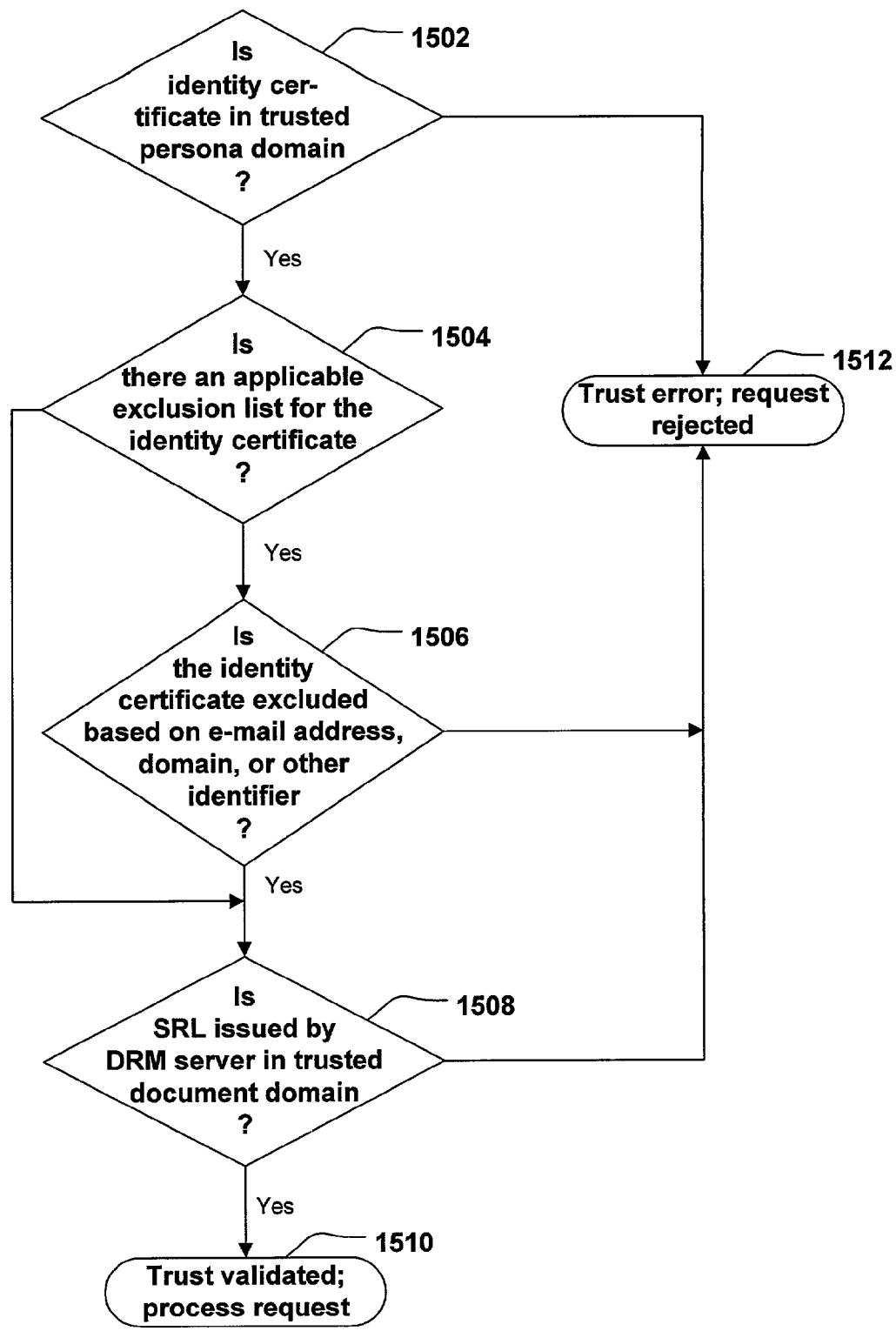
FIG. 15 is a flow diagram showing an exemplary process of validating trust for license requests in accordance with aspects of the invention.

FIG. 15 shows an exemplary process that a DRM server performs to validate trust for an incoming license request. The process incorporates the following concepts: (1) the identity certificate must be issued by a trusted identity server; (2) if the identity certificate is issued by a public e-mail address-based identity server, the persona (e.g., joe@untraceableaddress.com) or domain (e.g., high-security.com) named in the certificate must not be on an exclusion list; and (3) the rights label must have been issued by a server that the licensing DRM server has a relationship with.

After a DRM server receives an incoming license request (which preferably includes a signed rights label and an identity certificate), the DRM server determines whether the identity certificate is in a "trusted persona domain"—i.e., whether the identity certificate has been issued by a trusted identity server (step 1502). If the identity certificate is not in the trusted persona domain, then the license request is rejected due to a trust error (step 1512). If the identity certificate is in a trusted persona domain, then the process continues to step 1504.

At step 1504, the DRM server determines whether there is an applicable exclusion list for the trusted identity server that issued the identity certificate. One example mentioned above is where the issuer of the identity certificate is a public e-mail address-based identity server, such as a MICROSOFT.NET PASSPORT server, and where the DRM server has chosen to treat identity certificates issued by that server differently if those identity certificates have been issued to certain e-mail addresses and/or domains. However, it should be understood that an exclusion list can be set up for any identity server in the trusted persona domain; step 1504 thus generally includes determining whether there is an exclusion list associated with a particular trusted identity server.

If there is no exclusion list associated with the identity server that issued the identity certificate, then the process continues to step 1508. If, however, there is such an exclusion list, then the DRM server determines (step 1506) whether the identity certificate must be excluded (i.e., whether a license must be refused to such a certificate) based on the persona to whom that certificate has been issued (e.g., based on the e-mail address, domain, or other identifier specified in the identity certificate). If the identity certificate must be excluded for such reasons, then the license request is rejected due to a trust error (step 1512). On the other hand, if the exclusion list does not specify that the identity certificate must be excluded, then the process continues to step 1508.

At step 1508, the DRM server determines whether the signed rights label provided in the license request was issued by a DRM server in the licensing DRM server's "trusted document domain." As discussed above, this "trusted document domain" comprises: (a) the DRM server that is processing the licensing request; and (b) other DRM server that have provided their private keys to the DRM server that is processing the request (and that the licensing DRM server continues to trust). If the DRM sever that issued the signed rights label is not in the trusted document domain, then the licensing request is rejected due to a trust error (step 1512). If, on the other hand, the signed rights label was issued by a server in the trusted document domain, then the trust request is validated, and the license request is processed (step 1510).

The ultimate issuance of the license may take place according to the process described above in FIGS. 5A-5B. Moreover, the process described in FIG. 15 may be supplemental to the process described in FIG. 5A-5B, and these two processes may be interwoven together. In particular, steps 1502, 1504, and 1506 are essentially ways of authenticating and authorizing the requestor's identity (as shown in FIG. 5A, steps 604 and 606), and step 1508 is essentially a particular way of validating the signed rights label (as shown in FIG. 5B, step 630).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

Moreover, those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A computer-implemented method of licensing content comprising:
   receiving a license request, the license request comprising an identity certificate for an entity to whom the license is to be issued, the identity certificate indicating an issuer that issued the identity certificate;
   determining that the issuer of the identity certificate is trusted;
   determining that conditions for licensing the content to the entity are present;
   creating a license for the entity to use the content; and
   transmitting the license to the entity,
   wherein determining that the issuer of the identity certificate is trusted comprises:
   determining that the issuer issues identity certificates to the public based on e-mail addresses and passwords, the certificate indicating an e-mail address; and
   determining that neither the e-mail address nor a domain name identified in the e-mail address is on an exclusion list.

2. A computer-implemented method of licensing content comprising:
   receiving a license request, the license request comprising an identity certificate for an entity to whom the license is to be issued, the identity certificate indicating an issuer that issued the identity certificate;
   determining that the issuer of the identity certificate is trusted;
   determining that conditions for licensing the content to the entity are present;
   creating a license for the entity to use the content; and
   transmitting the license to the entity,
   wherein the method further comprises:
   determining that there is an applicable exclusion list for the issuer, the exclusion list comprising for the issuer one or more email addresses such that a license may not be issued for any identity certificate that is issued by the issuer and that contains an e-mail address that is on the exclusion list;
   determining that the identity certificate is not excluded according to the terms of the exclusion list, and
   determining that the identity certificate does not contain an e-mail address that is on the exclusion list.

3. The method of claim 2, wherein the exclusion list comprises one or more domain names such that a license may not be issued for any identity certificate that is issued by the issuer and that contains a domain name that is on the exclusion list, and wherein the method comprises:
   determining that the identity certificate does not contain a domain name that is on the exclusion list.

4. The method of claim 2, wherein the exclusion list comprises one or more identifiers such that a license may not be issued for any identity certificate that is issued by the issuer and that contains an identifier on the exclusion list, and wherein the method comprises:
   determining that the identity certificate does not contain an identifier that is on the exclusion list.

5. A computing system for licensing a piece of content, the piece of content having an associated rights label that comprises an encrypted decryption key for the content, the encrypted decryption key being decryptable, the system comprising:
   a set of private keys, each private key being associated with a particular publishing entity; and
   a license issuing module that receives the rights label, determines which publishing entity issued the rights label, determines whether the set of private keys includes the private key of the publishing entity that issued the rights label, decrypts the encrypted decryption key using the publishing entity's private key to produce a decryption key for the content, and that creates a license that includes the decryption key for the content.

6. The computing system of claim 5, wherein the license includes the decryption key for the content in an encrypted form.

7. The computing system of claim 5, wherein the rights label includes a certificate of the publishing entity that issued the rights label, and wherein the license issuing module identifies, based on the certificate, which private key in the set corresponds to the publishing entity that issued the rights label.

* * * * *